United States Patent
Yoon

(10) Patent No.: US 8,553,152 B2
(45) Date of Patent: Oct. 8, 2013

(54) MULTIMEDIA DEVICE HAVING OPERATING SYSTEM CAPABLE OF PROCESSING MULTIPLE GRAPHIC DATA AND METHOD FOR CONTROLLING THE SAME

(75) Inventor: Jaegu Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/345,232

(22) Filed: Jan. 6, 2012

(65) Prior Publication Data

US 2012/0176546 A1    Jul. 12, 2012

Related U.S. Application Data

(60) Provisional application No. 61/431,445, filed on Jan. 11, 2011.

(30) Foreign Application Priority Data

Jan. 12, 2011    (KR) ........................ 10-2011-0002943

(51) Int. Cl.
*H04N 5/54*    (2006.01)
*G06F 9/45*    (2006.01)

(52) U.S. Cl.
USPC ............................ 348/600; 717/146; 715/765

(58) Field of Classification Search
USPC .......... 348/600, 598, 589, 599; 345/619, 581, 345/58, 606, 592, 522, 629, 473
See application file for complete search history.

(56) References Cited

U.S. PATENT DOCUMENTS

| | | | |
|---|---|---|---|
| 6,538,660 B1 | 3/2003 | Celi, Jr. et al. | 345/592 |
| 6,753,864 B2 * | 6/2004 | Vienneau et al. | 345/473 |
| 7,168,048 B1 * | 1/2007 | Goossen et al. | 715/797 |
| 7,250,955 B1 * | 7/2007 | Beeman et al. | 345/592 |
| 7,603,132 B2 * | 10/2009 | Sim et al. | 455/466 |
| 7,868,893 B2 * | 1/2011 | Feth et al. | 345/522 |
| 8,184,127 B2 * | 5/2012 | Jeong | 345/619 |
| 8,189,918 B2 * | 5/2012 | Jung et al. | 382/180 |
| 8,327,277 B2 * | 12/2012 | Thakkar et al. | 715/753 |
| 2006/0184919 A1 | 8/2006 | Chen et al. | 717/127 |

FOREIGN PATENT DOCUMENTS

GB      2 349 290 A      10/2000

OTHER PUBLICATIONS

"Java Native Interface Specification 1.1"; May 16, 1997; URL:http://w3.adb.jg.se/javadocs/jdk....s/guide/jni/spec/jniTOC.doc.htm (retrieved Feb. 1, 2000); XP-002129468.

Di Giorgio, Rinaldo: "Use Native Methods to Expand the Java Environment"; Jul. 1997; URL:http://www.javaworld.com/javaworld/jw-07-1997//jw-07-javadev_p.html (retrieved Jun. 7, 2002); XP-002201720.

(Continued)

*Primary Examiner* — Paulos M Natnael
(74) *Attorney, Agent, or Firm* — Ked & Associates LLP

(57) ABSTRACT

A multimedia device provided with an operating system (OS) capable of processing a plurality of graphic data comprises a first client receiving first graphic data of a managed application; a native module pre-processing an application drafted in a native code; a second client receiving second graphic data of the application pre-processed by the native module; a composite module compositing the first graphic data output from the first client and the second graphic data output from the second client; and a display module outputting the composited first and second graphic data, wherein the composite module is accessed to the first client and the second client.

10 Claims, 34 Drawing Sheets

(56) References Cited

OTHER PUBLICATIONS

Cesar, Pablo, et al.: "Open Graphical Framework for Interactive TV"; IEEE Proceedings, Fifth International Symposium on Multimedia Software Engineering; Dec. 10-12, 2003; Piscataway, NJ; pp. 21-28; XP-010674443.

Cesar, Pablo, et al.: "A Graphics Architecture for High-End Interactive Television Terminals"; ACM Transactions on Multimedia Computing, Communications and Applications, vol. 2, No. 4; Nov. 2006; pp. 343-357; XP-040055195.

Montpetit, M. J., et al.: "The Future of IPTV: Adding Social Networking and Mobility"; IEEE Proceedings, 10th International Conference on—The Experience of Designing and Application of CAD Systems in Microelectronics; Piscataway, NJ; Jun. 8, 2009; pp. 405-409; XP-031514034.

European Search Report dated May 9, 2012 issued in Application No. 12 00 0113.

* cited by examiner

FIG. 17
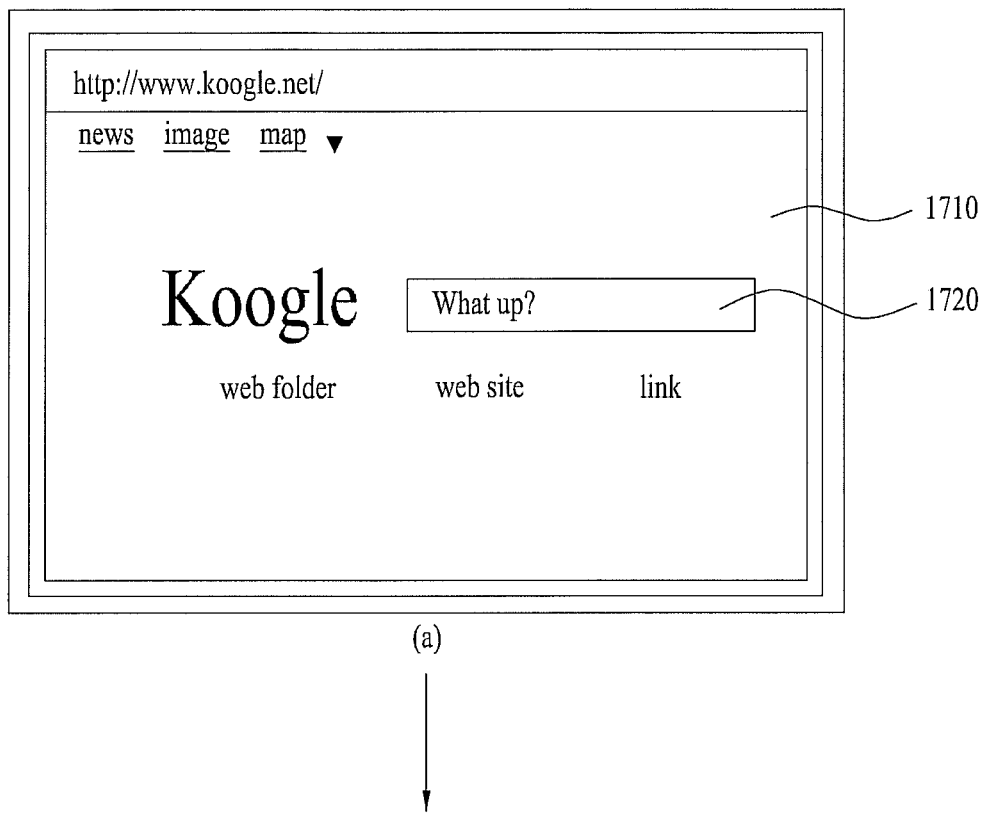
(a)
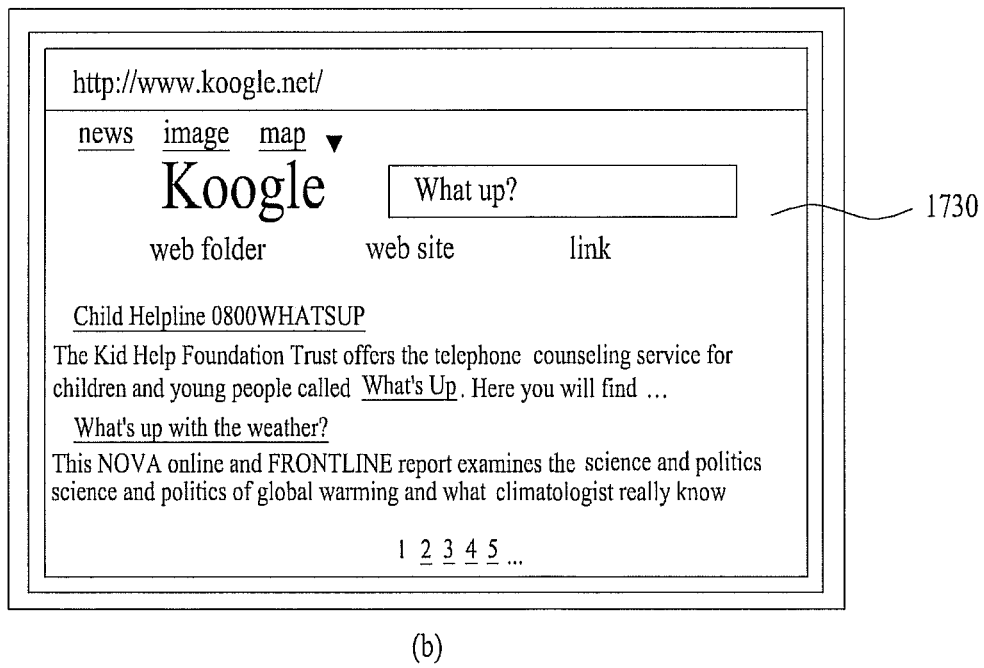
(b)

FIG. 18

1810 — Sign-in to yhoo!

ID
1820 — ******

PASSWORD
1825 — ******

☐ AUTO SIGN-IN (a)

http://www.yhoo.net/mail/tttt

| tttt@yhoo.net | received box | |
|---|---|---|
| ✉ read mail | sender | title |
| ✉ write mail | KK | aaa |
| ✉ check mail | LL | bbb111111111111111111111111111 |
| | MM | CCCCCCCCCCCCCCCCCC |
| • received box | NN | dddddddddddddddddd |
| • sent box | OO | eeeeeeeeeeeeeeeeeeeeee |
| • spam box | PP | No title |
| • recycle bin | | |
| | 1 2 3 4 5 ··· | | http://www.yhoo.net/

(b)

MULTIMEDIA DEVICE HAVING OPERATING SYSTEM CAPABLE OF PROCESSING MULTIPLE GRAPHIC DATA AND METHOD FOR CONTROLLING THE SAME

CROSS-REFERENCE TO RELATED APPLICATION(S)

This application claims priority under 35 U.S.C. §119 to U.S. Provisional Application No. 61/431,445 filed on Jan. 11, 2011 and Korean Patent Application No. 10-2011-0002943, filed on Jan. 12, 2011, whose entire disclosures are hereby incorporated by reference.

BACKGROUND

1. Field

The present disclosure relates to a multimedia device technology, and more particularly, to a multimedia device having an operating system capable of processing multiple graphic data and a method for controlling the same.

2. Background

A display apparatus is an apparatus having a function for receiving and processing broadcast video, for example, which can be viewed by a user. The display apparatus displays broadcasting selected by the user from broadcast signals transmitted from a broadcasting station. The worldwide tendency is currently towards digital broadcasting from analog broadcasting.

Digital broadcasting means broadcasting for transmitting digital image and audio signals. Since digital broadcasting is robuster to external noise than analog broadcasting, it little causes data loss, is more favorable for error correction, has high resolution, and provides definite picture image. Also, digital broadcasting enables bidirectional services unlike analog broadcasting. Recently, a smart TV having functions of a display apparatus and functions of a multimedia apparatus has been discussed.

Moreover, a mobile device, a PC, a tablet, and a TV, which are provided with a specific operating system (OS), have been developed. However, since the specific OS supports an application only drafted in a specific computing language (for example, C language, C++ language, Java language, etc.), in case of an application drafted in other language, a problem occurs in that the application should be redrafted in a corresponding computing language to support its graphics.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 17 is a diagram showing a third embodiment of a UI in either of the image display devices according to the embodiments of the present disclosure.

FIG. 18 is a diagram showing a fourth embodiment of a UI in either of the image display devices according to the embodiments of the present disclosure.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

The terms "module" and "unit" attached to describe the names of components are used herein to help the understanding of the components and thus should not be considered as having specific meanings or roles. Accordingly, the terms "module" and "unit" may be used interchangeably.

An image display device as set forth herein is an intelligent image display device equipped with a computer support function in addition to a broadcast reception function, for example. Since an Internet function is added to a broadcast reception function, the image display device may have user-friendly interfaces such as a handwriting input device, a touchscreen, or a pointing device. Further, because the image display device supports wired or wireless Internet, it is capable of e-mail transmission/reception, Web browsing, banking, gaming, etc. by connecting to the Internet or a computer. To implement these functions, the image display device may operate based on a standard, general-purpose Operating System (OS) such as Windows, Linux, Android, Unix based (e.g., MAC OSX).

Various applications can be freely added to or deleted from, for example, a general-purpose OS kernel of the image display device according to the present disclosure. Therefore, the image display device may perform a number of user-friendly functions. The image display device may be a network TV, a Hybrid broadcast broadband TV (HBBTV), a smart TV, etc. for example.

The image display device is also applicable to smart phones.

Embodiments of the present disclosure will be described in detail with reference to the attached drawings, but it should be understood that they are merely illustrative of the present disclosure and should not be interpreted as limiting the scope of the present disclosure.

In addition, although the terms used in the present disclosure are selected from generally known and used terms, some of the terms mentioned in the description of the present disclosure, the detailed meanings of which are described in relevant parts of the description herein, have been selected at the discretion of the applicant. Furthermore, the present disclosure must be understood, not simply by the actual terms used but by the meanings of each term lying within.

Figure 1:
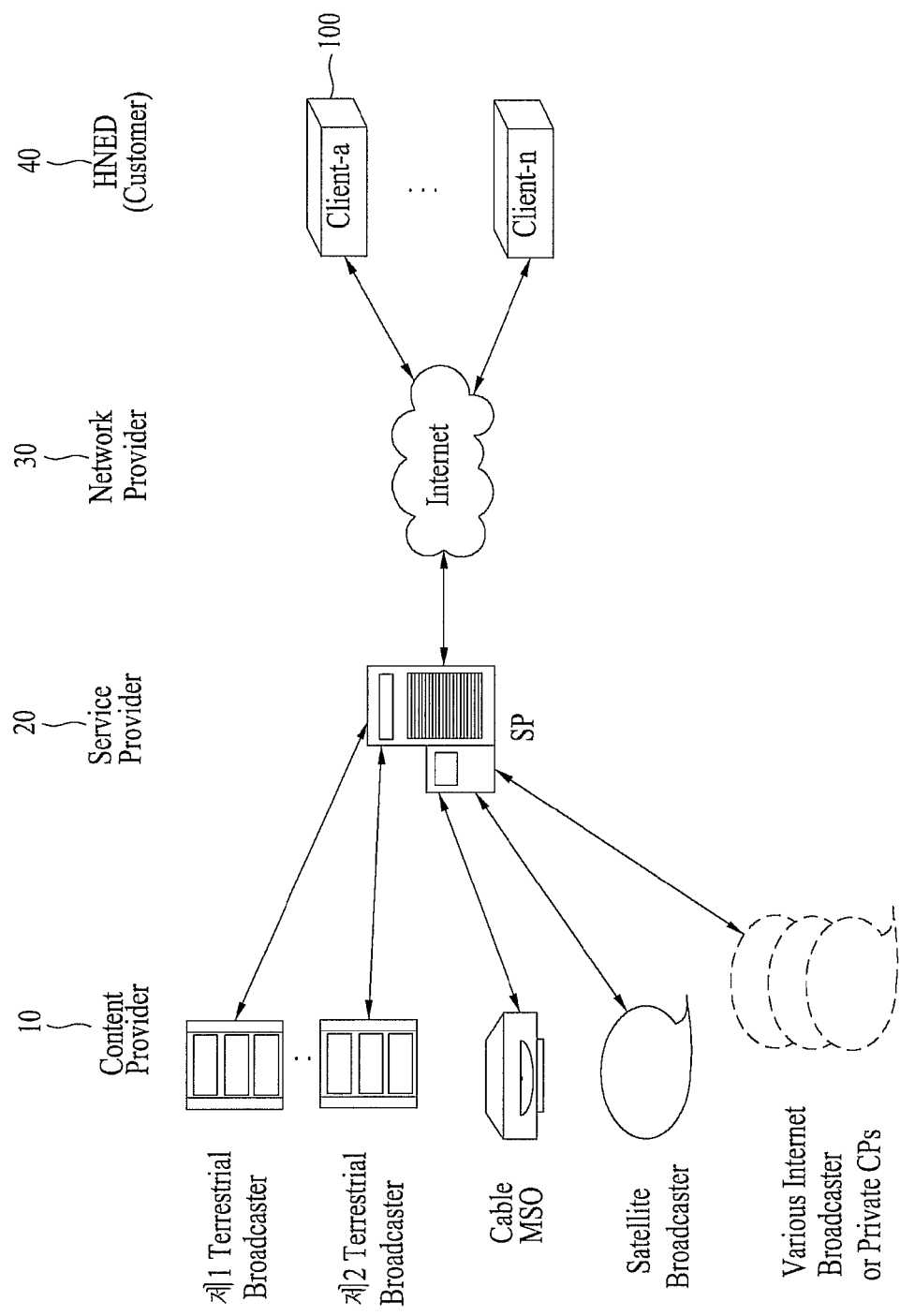
FIG. 1 is a schematic diagram showing an example of a broadcast system including an image display device according to an embodiment of the present disclosure.

FIG. 1 illustrates the overall configuration of a broadcast system including an image display device according to an embodiment of the present disclosure.

As shown in FIG. 1, the broadcast system including the image display device according to the embodiment of the present disclosure may include a Content Provider (CP) 10, a Service Provider (SP) 20, a Network Provider (NP) 30, and a Home Network End Device (HNED) 40. The HNED 40 corresponds to, for example, a client 100 which is an image display device according to an embodiment of the present disclosure. The client 100 corresponds to the image display device according to the embodiment of the present disclosure, and the image display device may be a network TV, a smart TV, an Internet Protocol TV (IPTV), etc.

The CP 10 creates and provides a variety of content. The CP 10 may be, for example, a terrestrial broadcaster, a cable System Operator (SO) or Multiple System Operator (MSO), a satellite broadcaster, or an Internet broadcaster, as illustrated in FIG. 1.

Besides broadcast content, the CP 10 may provide various applications, which will be described later in detail.

The SP 20 may provide content received from the CP 10 as a service package. For instance, the SP 20 may package first terrestrial broadcasts, second terrestrial broadcasts, cable MSOs, satellite broadcasts, various Internet broadcasts, and applications and provide the package to users.

The SP 20 may unicast or multicast a service to the client 100. Unicast is a form of transmission in which data is sent from only one transmitter to only one receiver. In an example of unicast transmission, upon receipt of a request for data from a receiver, a server transmits the data to only one receiver. Multicast is a type of transmission or communication in which a transmitter transmits data to a group of receivers. For example, a server may transmit data to a plurality of pre-registered receivers at one time. For multicast registration, the Internet Group Management Protocol (IGMP) may be used.

The NP 30 may provide a network over which a service is provided to the client 100. The client 100 may construct a home network end user (HNED) and receive a service over the HNED.

Content transmitted in the above-described system including the image display device may be protected through conditional access or content protection. CableCard and Downloadable Conditional Access System (DCAS) are examples of such conditional access or content protection systems.

The client 100 may also transmit content over a network. In this case, the client 100 serves as a CP and thus the CP 10 may receive content from the client 100. Therefore, an interactive content service or data service can be provided.

Figure 2:
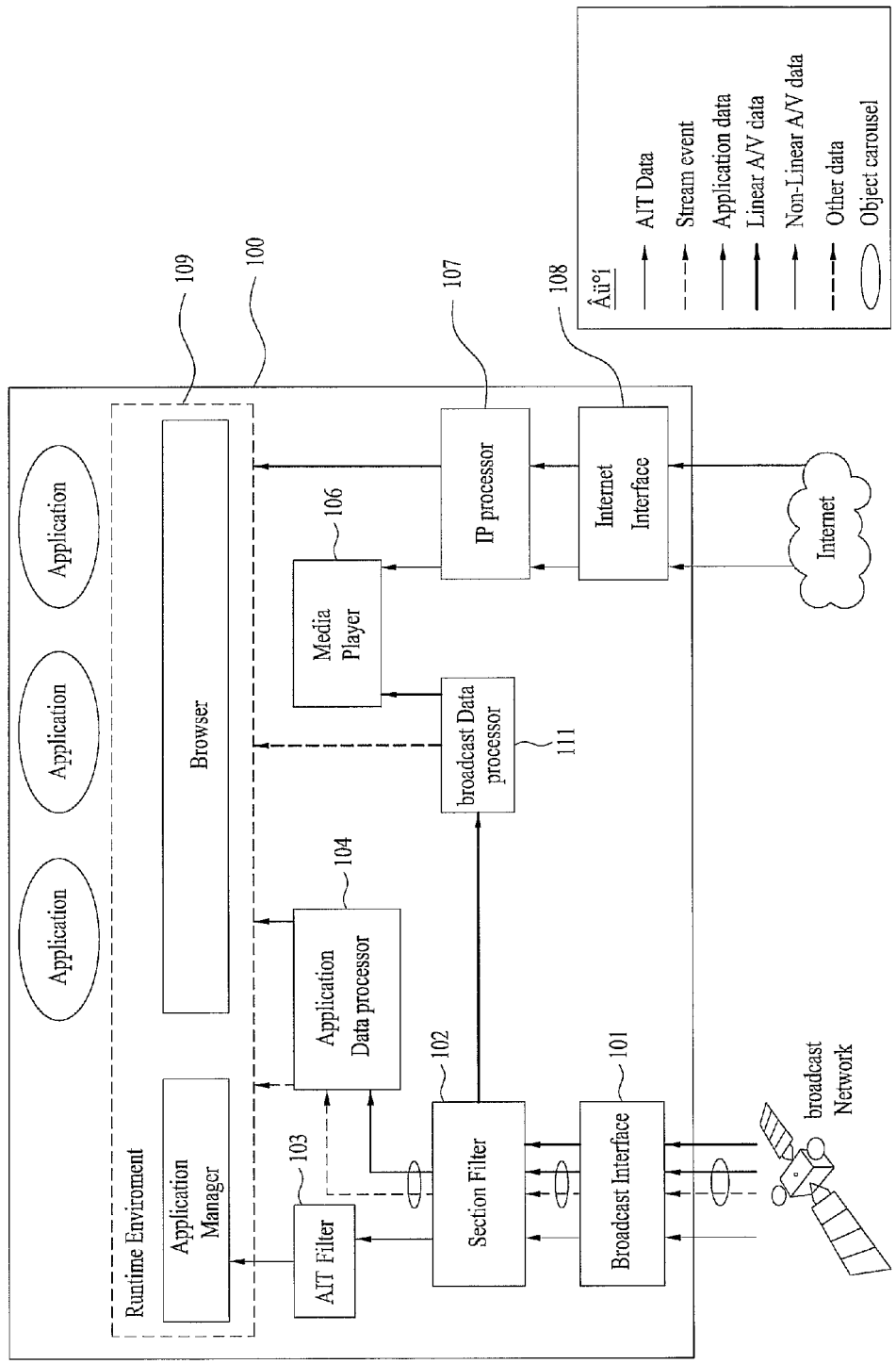
FIG. 2 is a schematic diagram showing another example of a broadcast system including an image display device according to another embodiment of the present disclosure.

FIG. 2 illustrates the overall configuration of a broadcast system including an image display device according to another embodiment of the present disclosure.

As shown in FIG. 2, the image display device 100 according to another embodiment of the present disclosure is connected to a broadcast network and the Internet. The image display device 100 is, for example, a network TV, a smart TV, an HBBTV, etc.

The image display device 100 includes, for example, a broadcast interface 101, a section filter 102, an Application Information Table (AIT) filter 103, an application data processor 104, a broadcast data processor 111, a media player 106, an Internet Protocol (IP) processor 107, an Internet interface 108, and a runtime module 109.

The image display device 100 receives AIT data, real-time broadcast content, application data, and stream events through the broadcast interface 101. The real-time broadcast content may be referred to as linear Audio/Video (A/V) content.

The section filter 102 performs section filtering on the four types of data received through the broadcast interface 101, and outputs the AIT data to the AIT filter 103, the linear A/V content to the broadcast data processor 111, and the stream events and application data to the application data processor 104.

Meanwhile, the image display device 100 receives non-linear A/V content and application data through the Internet interface 108. The non-linear NV content may be, for example, a Content On Demand (CoD) application.

The non-linear A/V content and the application data are transmitted to the media player 106 and the runtime module 109, respectively.

The runtime module 109 includes, for example, an application manager and a browser as illustrated in FIG. 2. The application manager controls the life cycle of an interactive application using the AIT data, for example. The browser displays and processes the interactive application.

The game application according to one embodiment of the present disclosure is received through the broadcast interface 101 or the Internet interface 108 shown in FIG. 2.

The game application received through the broadcast interface 101 is transmitted to the runtime module 109 through the application data processor 104. The game application received through the Internet interface 108 is transmitted to the runtime module 109 through the IP processor 107.

The runtime module 109 executes the game application.

Figure 3:
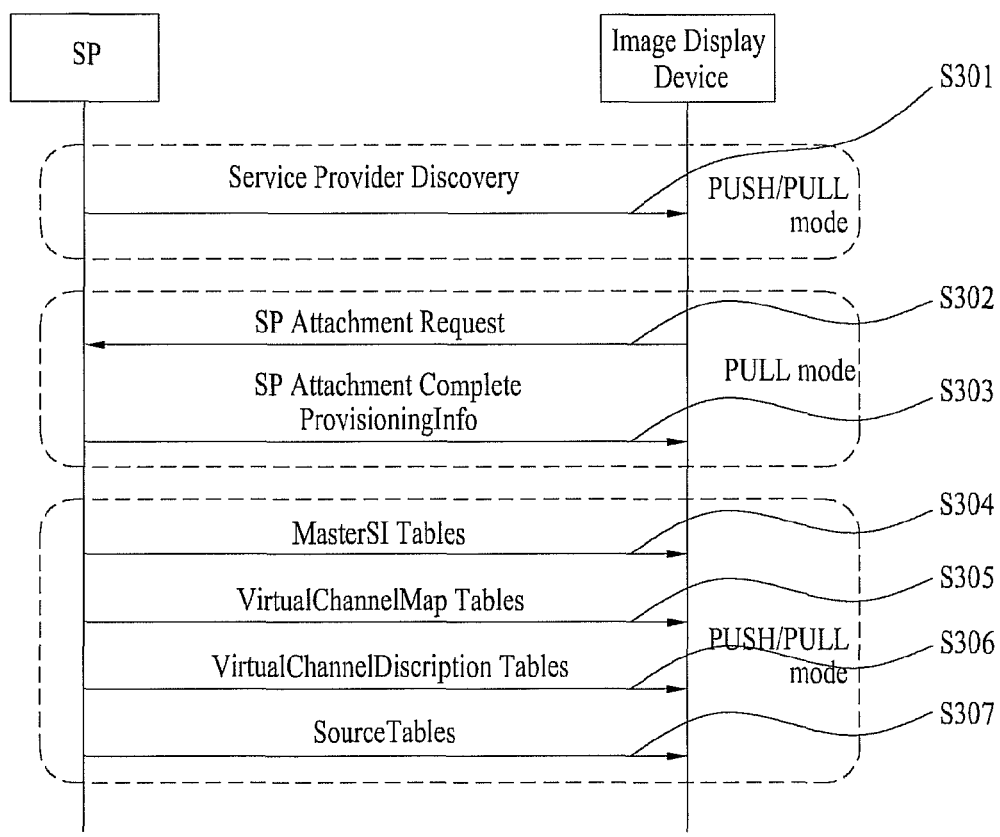
FIG. 3 is a diagram showing steps in which the image display device shown in FIG. 1 or 2 accesses a service provider and receives channel information, etc.

FIG. 3 is a diagram showing steps in which the image display device shown in FIG. 1 or 2 accesses an SP and receives channel information, etc.

FIG. 3 is purely exemplary and the method shown in FIG. 3 does not limit the scope of the present disclosure.

The SP performs an SP discovery operation (S301). The image display device transmits an SP attachment request signal (S302). Upon completion of attachment to the SP, the image display device receives provisioning information from the SP (S303). Further, the image display device receives Master System Information (SI) Tables (S304), receives Virtual Channel Map Tables (S305), receives Virtual Channel Description Tables (S306), and receives Source Tables from the SP (S307).

More specifically, SP Discovery is a process by which SPs that provide IPTV services search for servers providing services to the SPs.

In order to receive information (e.g., SP discovery information) about the service discovery (SD) servers, an SD server address list can be detected, for example, using three methods, specifically use of an address preset in the image display device or an address manually set by a user, Dynamic Host Configuration Protocol (DHCP)-based SP Discovery, and Domain Name System Service (DNS SRV)-based SP Discovery. The image display device accesses a specific SD server using the SD server address list obtained through one of the above three methods and receives an SP Discovery record from the specific SD server. The Service Provider Discovery record includes information needed to perform Service Discovery on an SP basis. The image display device then starts a Service Discovery operation using the SP Discovery record. These operations can be performed in a push mode or a pull mode.

The image display device accesses an SP attachment server specified by an SP attachment locator included in the SP Discovery record and performs a registration procedure (or a service attachment procedure).

Further, after accessing an authentication service server of an SP specified by an SP authentication locator and performing an authentication procedure, the image display device may perform a service authentication procedure.

Once service attachment is successfully completed, a server may transmit data to the image display device in the form of a provision information table.

During service attachment, the image display device may include an Identifier (ID) and location information thereof in data and transmit the data to the service attachment server. Thus the service attachment server may specify a service that the image display device has subscribed to based on the ID and location information. In addition, the service attachment server provides, in the form of a provisioning information table, address information from which the image display device can obtain Service Information (SI). The address information corresponds to access information about a Master SI Table. This method facilitates provision of a customized service to each subscriber.

The SI is divided into a Master SI Table record for managing access information and version information about a Virtual Channel Map, a Virtual Channel Map Table for providing a list of services in the form of a package, a Virtual Channel Description Table that contains details of each channel, and a Source Table that contains access information about actual services.

The image display device shown in FIG. 3 receives the game application according to the embodiment of the present disclosure from the SP or a virtual channel provided by a broadcast station.

Figure 4:
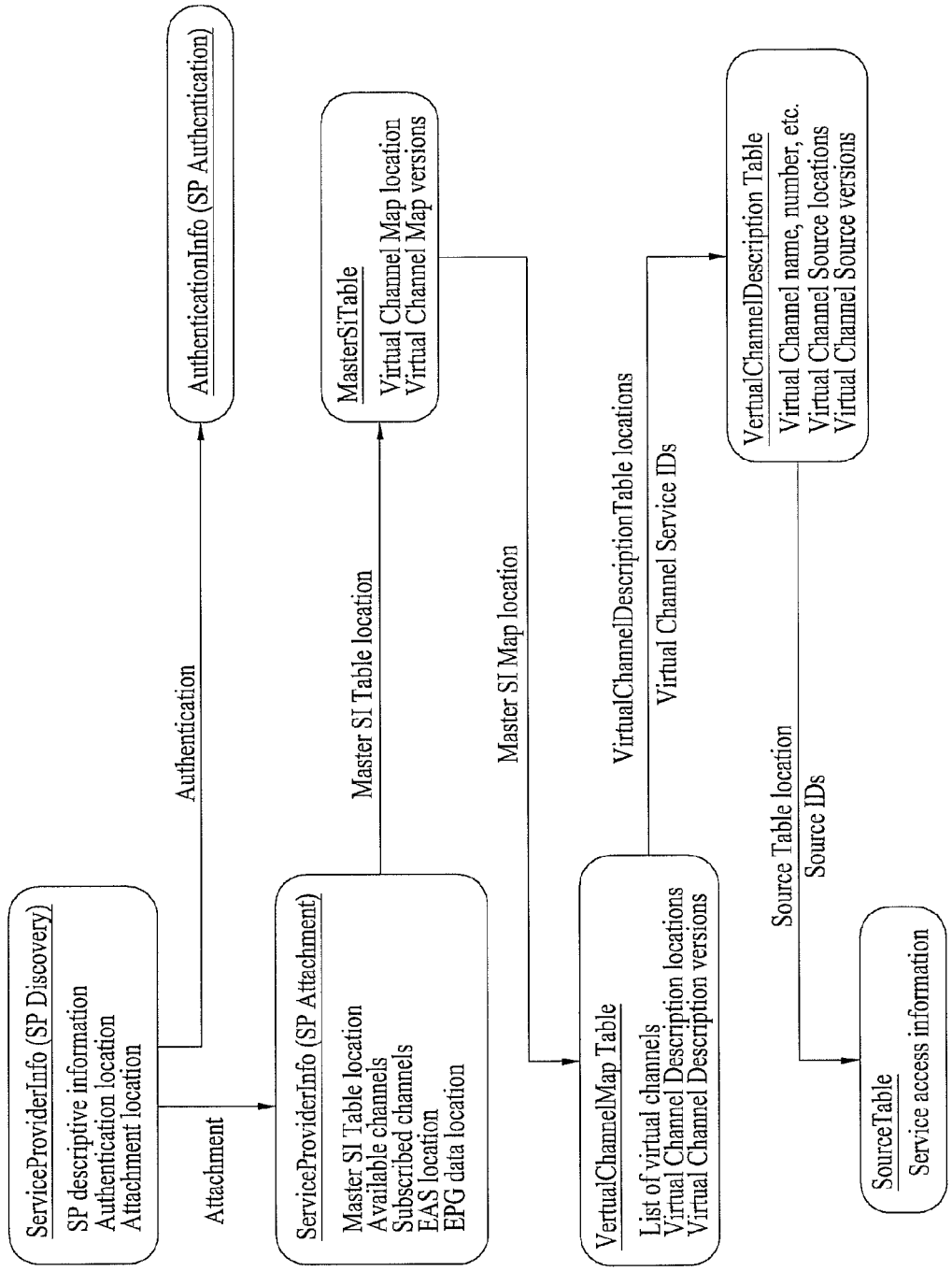
FIG. 4 is a diagram showing an example of data used in the steps shown in FIG. 3.

FIG. 4 is a diagram showing an example of data used in the steps shown in FIG. 3.

FIG. 4 is a detailed diagram of FIG. 3, illustrating a relationship among data in the SI.

A Master SI Table contains information about the location and version of each Virtual Channel MAP.

Each Virtual Channel MAP is identified by its Virtual Channel MAP identifier. Virtual Channel MAP Version specifies the version number of the Virtual Channel MAP. If any of the tables connected to the Master SI Table shown in FIG. 4 in the arrowed direction is modified, the versions of the modified table and overlying tables thereof (up to the Master SI Table) are incremented. Accordingly, a change in any of the SI tables can be readily identified by monitoring the Master SI Table.

For example, when the Source Table is changed, the version of the Source Table is incremented and the version of the Virtual Channel Description Table that references the Source Table is also incremented. In conclusion, a change in any lower table leads to a change in its higher tables and, eventually, a change in the Master SI Table.

One Master SI Table may exist for each SP. However, in the case where service configurations differ for regions or subscribers (or subscriber groups), an SP may have a plurality of Master SI Tables in order to provide a customized service on a unit basis. Thus it is possible to efficiently provide a customized service to a subscriber through the master SI table according to a region in which the subscriber is located and subscriber information regarding the subscriber.

A Virtual Channel Map Table may contain one or more virtual channels. A Virtual Channel Map includes not only details of the channels but information about the locations of the details of the channels. In the Virtual Channel Map Table, Virtual Channel Description Location specifies the location of a Virtual Channel Description Table including the details of the channels.

The Virtual Channel Description Table contains the details of the virtual channels. The Virtual Channel Description Table can be accessed using the Virtual Channel Description Location of the Virtual Channel Map Table.

A Source Table provides information necessary to access actual services (e.g. IP addresses, ports, AV Codecs, transmission protocols, etc.) on a service basis.

The above-described Master SI Table, the Virtual Channel Map Table, the Virtual Channel Description Table and the Source Table are delivered in four logically separate flows, in a push mode or a pull mode. For version management, the Master SI Table may be multicast and thus version changes can be monitored by receiving a multicast stream.

Figure 5:
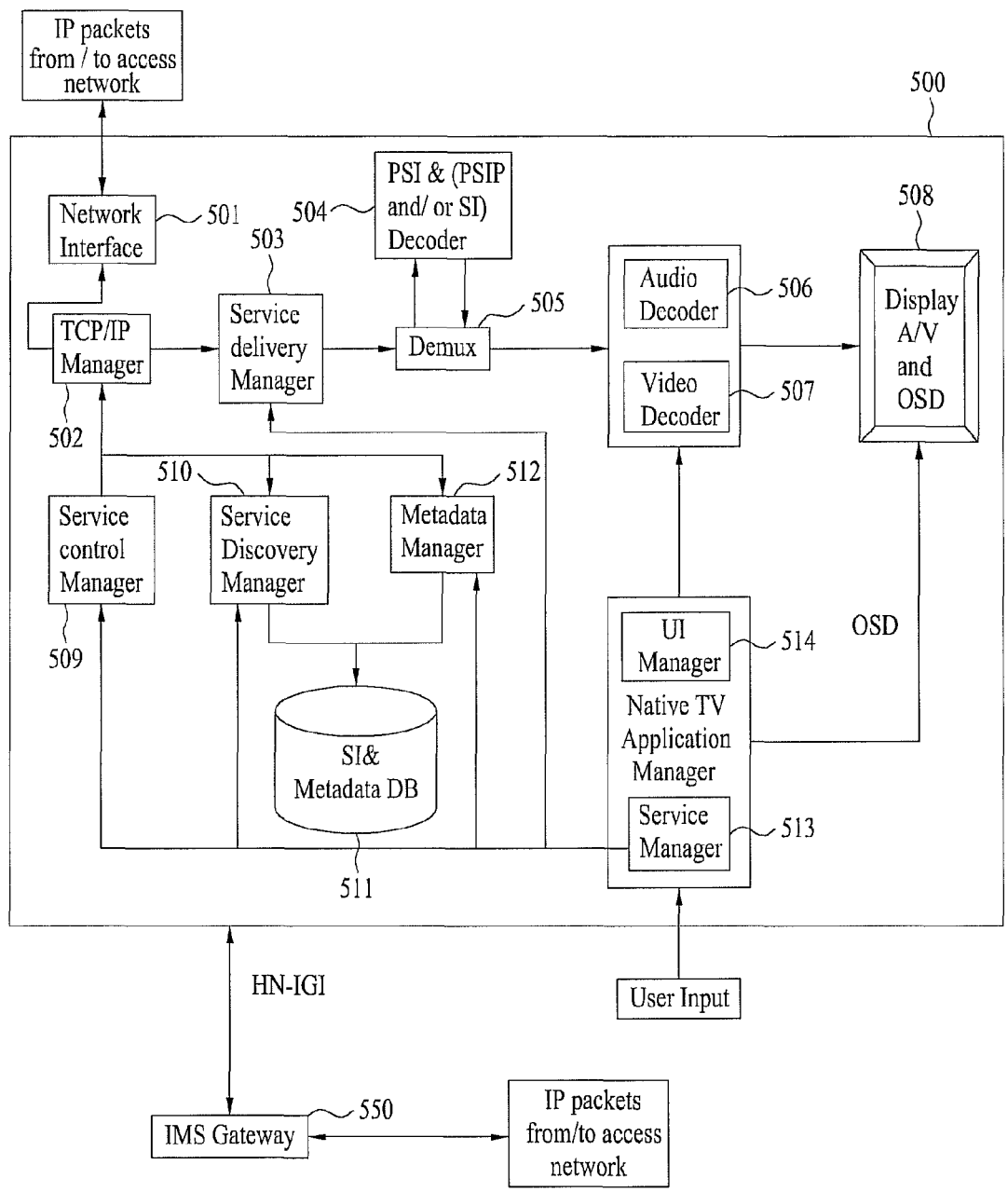
FIG. 5 is a diagram showing an example of the image display device shown in FIG. 1 or 2 in greater detail.

FIG. 5 is a detailed block diagram of the image display device shown in FIG. 1 or 2 according to an embodiment of the present disclosure. The structure of the image display device in FIG. 5 is purely exemplary and should not be interpreted as limiting the scope of the present disclosure.

An image display device 500 includes a network interface 501, a Transmission Control Protocol/Internet Protocol (TCP/IP) manager 502, a service delivery manager 503, a demultiplexer (DEMUX) 505, a Program Specific Information (PSI) & (Program and System Information Protocol (PSIP) and/or SI) decoder 504, an audio decoder 506, a video decoder 507, a display A/V and OSD module 508, a service control manager 509, a service discovery manager 510, a metadata manager 512, an SI & metadata database (DB) 511, a User Interface (UI) manager 514, and a service manager 513.

The network interface 501 transmits packets to and receives packets from a network. Specifically, the network interface 501 receives services and content from an SP over the network.

The TCP/IP manager 502 is involved in packet reception and transmission of the image display device 500, that is, packet delivery from a source to a destination. The TCP/IP manager 502 classifies received packets according to appropriate protocols and outputs the classified packets to the service delivery manager 505, the service discovery manager 510, the service control manager 509, and the metadata manager 512.

The service delivery manager 503 controls reception of service data.

For example, when controlling real-time streaming data, the service delivery manager 503 may use the Real-time Transport Protocol/Real-time Transport Control Protocol (RTP/RTCP). If real-time streaming data is transmitted over RTP, the service delivery manager 503 parses the received real-time streaming data using RTP and transmits the parsed real-time streaming data to the DEMUX 505 or stores the parsed real-time streaming data in the SI & metadata DB 511 under the control of the service manager 513. In addition, the service delivery manager 503 feeds back network reception information to a server that provides the service using RTCP.

The DEMUX 505 demultiplexes a received packet into audio data, video data and PSI data and transmits the audio data, video data and PSI data to the audio decoder 506, the video decoder 507, and the PSI & (PSIP and/or SI) decoder 504, respectively.

The PSI & (PSIP and/or SI) decoder 504 decodes SI such as PSI. More specifically, the PSI & (PSIP and/or SI) decoder 504 receives and decodes PSI sections, PSIP sections or SI sections demultiplexed by the DEMUX 505.

The PSI & (PSIP and/or SI) decoder 504 constructs an SI DB by decoding the received sections and stores the SI DB in the SI & metadata DB 511.

The audio decoder 506 and the video decoder 507 decode the audio data and the video data received from the DEMUX 505 and output the decoded audio and video data to a user through the display A/V and OSD module 508.

The UI manager 514 and the service manager 513 manage the overall state of the image display device 500, provide UIs, and manage other managers.

The UI manager 514 provides a Graphical User Interface (GUI) in the form of an OSD and performs a reception operation corresponding to a key input received from the user. For example, upon reception of a key input signal regarding channel selection from the user, the UI manager 514 transmits the key input signal to the service manager 513.

The service manager 513 controls managers associated with services, such as the service delivery manager 503, the service discovery manager 510, the service control manager 509, and the metadata manager 512.

The service manager 513 also creates a channel map and selects a channel using the channel map according to the key input signal received from the UI manager 514. The service manager 513 sets the audio/video Packet ID (PID) of the selected channel based on SI of the channel received from the PSI & (PSIP and/or SI) decoder 504 in the demultiplexer 505.

The service discovery manager 510 provides information necessary to select an SP that provides a service. Upon receipt of a channel selection signal from the service manager 513, the service discovery manager 510 detects a service based on the channel selection signal.

The service control manager 509 takes charge of selection and control services. For example, if a user selects a live broadcasting service, such as a conventional broadcasting service, the service control manager selects and controls the service using Internet Group Management Protocol (IGMP) or Real-Time Streaming Protocol (RTSP). If the user selects Video on Demand (VoD), the service control manager 509 selects and controls the service using RTSP.

RTSP supports trick mode for real-time streaming. Further, the service control manager 509 may initialize and manage a session through an IP Multimedia Control (IMC) gateway using IP Multimedia Subsystem (IMS) and Session Initiation Protocol (SIP). The protocols are only exemplary and thus other protocols are also applicable.

The metadata manager 512 manages metadata related to services and stores the metadata in the SI & metadata DB 511.

The SI & metadata DB 511 stores the SI decoded by the PSI & (PSIP and/or SI) decoder 504, the metadata managed by the metadata manager 512, and the information required to select an SP, received from the service discovery manager 510. The SI & metadata DB 511 may store system setup data.

The SI & metadata DB 511 may be constructed in a Non-Volatile RAM (NVRAM) or a flash memory.

An IMS Gateway (IG) 550 is a gateway equipped with functions needed to access IMS-based IPTV services.

The UI manager 514 of the image display device 500 shown in FIG. 5 serves to control the game application according to the embodiment of the present disclosure. In particular, the UI manager 514 operates according to a user input signal.

Figure 6:
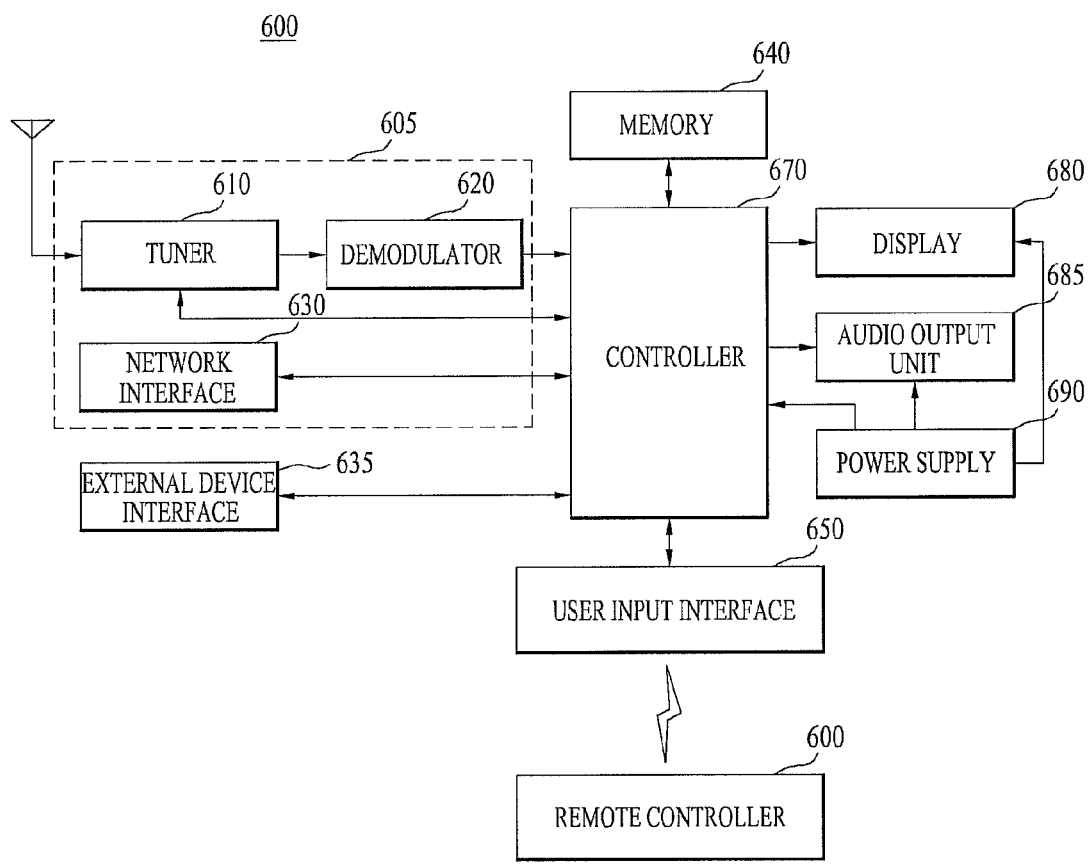
FIG. 6 is a diagram showing another example of the image display device shown in FIG. 1 or 2 in greater detail.

FIG. 6 is a detailed block diagram of the image display device shown in FIG. 1 or 2 according to another embodiment of the present disclosure.

Referring to FIG. 6, an image display device 600 according to another embodiment of the present disclosure includes a broadcast receiver 605, an external device interface 635, a memory 640, a user input interface 650, a controller 670, a display 680, an audio output unit 685, a power supply 690, and a camera module (not shown). The broadcasting receiver 605 may include a tuner 610, a demodulator 620 and a network interface 630. As needed, the broadcasting receiver 605 may be configured so as to include only the tuner 610 and the demodulator 620 or only the network interface 630.

The tuner 610 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 610 downconverts the tuned RF broadcast signal into a digital IF signal (DIF). On the other hand, if the tuned RF broadcast signal is an analog broadcast signal, the tuner 610 downconverts the tuned RF broadcast signal into an analog baseband video or audio signal CVBS/SIF. That is, the tuner 610 may be a hybrid tuner capable of processing not only digital broadcast signals but also analog broadcast signals. The analog baseband video or audio signal CVBS/SIF may be directly input to the controller 670.

The tuner 610 may be capable of receiving RF broadcast signals from an Advanced Television Systems Committee (ATSC) single-carrier system or from a Digital Video Broadcasting (DVB) multi-carrier system.

The tuner 610 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 620 receives the digital IF signal DIF from the tuner 610 and demodulates the digital IF signal DIF.

For example, if the digital IF signal DIF is an ATSC signal, the demodulator 620 may perform 8-Vestigal SideBand (VSB) demodulation on the digital IF signal DIF. The demodulator 620 may also perform channel decoding.

For channel decoding, the demodulator 620 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 620 performs Coded Orthogonal Frequency Division Multiple Access (COFDMA) demodulation upon the digital IF signal DIF. The demodulator 620 may also perform channel decoding. For channel decoding, the demodulator 620 may include a convolution decoder (not shown), a de-interleaver (not shown), and a Reed-Solomon decoder (not shown) so as to perform convolution decoding, de-interleaving, and Reed-Solomon decoding.

The demodulator 620 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 620 may include an ATSC demodulator and a DVB demodulator.

The TS output from the demodulator 620 may be input to the controller 670 and thus subjected to demultiplexing and A/V signal processing. The processed video and audio signals are output to the display 680 and the audio output unit 685, respectively.

The external device interface 635 may serve as an interface between an external device and the image display device 600. For interfacing, the external device interface 635 may include an A/V Input/Output (I/O) unit (not shown) and/or a wireless communication module (not shown).

The external device interface 635 may be connected to an external device such as a Digital Versatile Disc (DVD) player, a Blu-ray player, a game console, a camera, a camcorder, or a computer (e.g., a laptop computer), wirelessly or by wire. Then, the external device interface 635 externally receives video, audio, and/or data signals from the external device and transmits the received input signals to the controller 670. In addition, the external device interface 635 may output video, audio, and data signals processed by the controller 670 to the external device. In order to receive or transmit audio, video and data signals from or to the external device, the external device interface 635 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 600.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 635 may be connected to various set-top boxes through at least one of the above-described ports and may thus perform an I/O operation with the various set-top boxes.

The external device interface 635 may receive applications or an application list from an adjacent external device and provide the applications or the application list to the controller 670 or the memory 640.

The network interface 630 serves as an interface between the image display device 600 and a wired/wireless network such as the Internet. The network interface 630 may include an Ethernet port for connection to a wired network. For connection to wireless networks, the network interface 630 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 630 may transmit data to or receive data from another user or electronic device over a connected network or another network linked to the connected network. Especially, the network interface 630 may transmit data stored in the image display device 600 to a user or electronic device selected from among users or electronic devices pre-registered with the image display device 600.

The network interface 630 may access a specific Web page over a connected network or another network linked to the connected network. That is, the network interface 630 may access a specific Web page over a network and transmit or receive data to or from a server. Additionally, the network interface 630 may receive content or data from a CP or an NP. Specifically, the network interface 630 may receive content such as movies, advertisements, games, VoD, and broadcast signals, and information related to the content from a CP or an NP. Also, the network interface 630 may receive update information about firmware from the NP and update the firmware. The network interface 630 may transmit data over the Internet or to the CP or the NP.

The network interface 630 may selectively receive a desired application among open applications over a network.

In an embodiment of the present disclosure, when a game application is executed in the image display device, the network interface 630 may transmit data to or receive data from a user terminal connected to the image display device through a network. In addition, the network interface 630 may transmit specific data to or receive specific data from a server that records game scores.

The memory 640 may store various programs necessary for the controller 670 to process and control signals, and may also store processed video, audio and data signals.

The memory 640 may temporarily store a video, audio and/or data signal received from the external device interface 635 or the network interface 630.

The memory 640 may store information about broadcast channels by the channel storage function.

The memory 640 may store applications or a list of applications received from the external device interface 135 or the network interface 630.

The memory 640 may store a variety of platforms which will be described later.

In an embodiment of the present disclosure, when the image display device provides a game application, the memory 640 may store user-specific information and game play information of a user terminal used as a game controller.

The memory 640 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory (EEPROM). The image display device 600 may reproduce content stored in the memory 640 (e.g. video files, still image files, music files, text files, and application files) to the user.

While the memory 640 is shown in FIG. 6 as configured separately from the controller 670, to which the present disclosure is not limited, the memory 640 may be incorporated into the controller 670, for example.

The user input interface 650 transmits a signal received from the user to the controller 670 or transmits a signal received from the controller 670 to the user.

For example, the user input interface 650 may receive control signals such as a power-on/off signal, a channel selection signal, and a screen setting signal from a remote controller 611 or may transmit a control signal received from the controller 670 to the remote controller 611, according to various communication schemes, for example, RF communication and IR communication.

For example, the user input interface 650 may provide the controller 670 with control signals received from local keys (not shown), such as inputs of a power key, a channel key, and a volume key, and setting values.

Also, the user input interface 650 may transmit a control signal received from a sensor unit (not shown) for sensing a user gesture to the controller 670 or transmit a signal received from the controller 670 to the sensor unit. The sensor unit may include a touch sensor, a voice sensor, a position sensor, a motion sensor, etc.

The controller 670 may demultiplex the TS received from the tuner 610, the demodulator 620, or the external device interface 635 into a number of signals and process the demultiplexed signals into audio and video data.

The video signal processed by the controller 670 may be displayed as an image on the display 680. The video signal processed by the controller 670 may also be transmitted to an external output device through the external device interface 635.

The audio signal processed by the controller 670 may be audibly output through the audio output unit 685. Also, the audio signal processed by the controller 670 may be transmitted to the external output device through the external device interface 635.

While not shown in FIG. 6, the controller 670 may include a DEMUX and a video processor, which will be described later with reference to FIG. 10.

In addition, the controller 670 may provide overall control to the image display device 600. For example, the controller 670 may control the tuner 610 to tune to an RF broadcast signal corresponding to a user-selected channel or a pre-stored channel.

The controller 670 may control the image display device 600 according to a user command received through the user input interface 650 or according to an internal program. Especially the controller 670 may access a network and download an application or application list selected by the user to the image display device 600 over the network.

For example, the controller 670 controls the tuner 610 to receive a signal of a channel selected according to a specific channel selection command received through the user input interface 650 and processes a video, audio and/or data signal of the selected channel. The controller 670 outputs the processed video or audio signal along with information about the user-selected channel to the display 680 or the audio output unit 685.

As another example, the controller 670 outputs a video or audio signal received from an external device such as a camera or a camcorder through the external device interface 635 to the display 680 or the audio output unit 685 according to an external device video playback command received through the external device interface 650.

The controller 670 may control the display 680 to display images. For instance, the controller 670 may control the display 680 to display a broadcast image received from the tuner 610, an externally input image received through the external device interface 635, an image received through the network interface 630, or an image stored in the memory 640. The image displayed on the display 680 may be a Two-Dimensional (2D) or Three-Dimensional (3D) still image or moving picture.

The controller 670 may control content playback. The content may include any content stored in the image display device 600, received broadcast content, and externally input content. The content includes at least one of a broadcast image, an externally input image, an audio file, a still image, a Web page, or a text file.

Upon receipt of a return-to-home screen input, the controller 670 may control display of the home screen on the display 680.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device.

The card objects may further include at least one of a card object representing a list of connected external devices or a card object representing a call-associated list.

The home screen may further include an application menu including at least one application that can be executed. Accordingly, the game application according to the embodiment of the present disclosure may be designed in a format selectable through the application menu of the above-described home screen. Further, in the present disclosure, user convenience may be improved by adding or deleting the game application to or from the application menu according to user selection.

Upon receipt of a card object move input, the controller 670 may control movement of a card object corresponding to the card object move input on the display 680, or if the card object is not displayed on the display 680, the controller 670 may control display of the card object on the display 680.

When a card object is selected from among the card objects on the home screen, the controller 670 may control display of an image corresponding to the selected card object on the display 680.

The controller 670 may control display of an input broadcast image and an object representing information about the broadcast image in a card object representing broadcast images. The size of the broadcast image may be set to a fixed size.

The controller 670 may control display of a set-up object for at least one of image setting, audio setting, screen setting, reservation setting, setting of a pointer of the remote controller, or network setting on the home screen.

The controller 670 may control display of a log-in object, a help object, or an exit object on a part of the home screen.

The controller 670 may control display of an object representing the total number of available card objects or the number of card objects displayed on the display 680 among all card objects, on a part of the home screen.

If one of the card objects displayed on the display 680 is selected, the controller 670 may fullscreen the selected card object to cover the entirety of the display 680.

Upon receipt of an incoming call at a connected external device or the image display device 600, the controller 670 may control focusing-on or shift of a call-related card object among the plurality of card objects.

If an application view menu item is selected, the controller 670 may control display of applications or a list of applications that are present in the image display device 600 or downloadable from an external network.

The controller 670 may control installation and execution of an application downloaded from the external network along with various UIs.

Also, the controller 670 may control display of an image related to the executed application on the display 680, upon user selection.

In an embodiment of the present disclosure, when the image display device provides a game application, the controller 670 may control assignment of player IDs to specific user terminals, creation of game play information by executing the game application, transmission of the game play information corresponding to the player IDS assigned to the user terminals through the network interface 630, and reception of the game play information at the user terminals.

The controller 670 may control detection of user terminals connected to the image display device over a network through the network interface 630, display of a list of the detected user terminals on the display 680 and reception of a selection signal indicating a user terminal selected for use as a user controller from among the detected user terminals through the user input interface 650.

The controller 670 may control output of a game play screen of the game application, inclusive of player information of each user terminal and game play information, through the display 680.

The controller 670 may determine the specific signal received from a user terminal through the network interface 630 as game play information and thus control the game play information to be reflected in the game application in progress.

The controller 670 may control transmission of the game play information of the game application to a specific server connected over a network through the network interface 630.

As another embodiment, upon receipt of information about a change in the game play information from a predetermined server through the network interface 630, the controller 670 may control output of a notification message in a predetermined area of the display 680.

Although not shown, the image display device 600 may further include a channel browsing processor for generating thumbnail images corresponding to channel signals or externally input signals.

The channel browsing processor may receive the TS output from the demodulator 620 or the TS output from the external device interface 635, extract images of the received TS and generate thumbnail images. The thumbnail images may be directly output to the controller 670 or may be output after being encoded. Also, it is possible to encode the thumbnail images into a stream and output the stream to the controller 670. The controller 670 may display a thumbnail list including a plurality of received thumbnail images on, the display 680. The thumbnail images may be updated sequentially or simultaneously in the thumbnail list. Therefore, the user can readily identify the content of broadcast programs received through a plurality of channels.

The display 680 may convert a processed video signal, a processed data signal, and an OSD signal received from the controller 670 or a video signal and a data signal received from the external device interface 635 into RGB signals, thereby generating driving signals.

The display 680 may be various types of displays such as a Plasma Display Panel (PDP), a Liquid Crystal Display (LCD), an Organic Light-Emitting Diode (OLED) display, a flexible display, and a 3D display.

The display 680 may also be a touchscreen that can be used not only as an output device but also as an input device.

The audio output unit 685 may receive a processed audio signal (e.g., a stereo signal, a 3.1-channel signal or a 5.1-channel signal) from the controller 670 and output the received audio signal as sound. The audio output unit 685 may employ various speaker configurations.

To sense a user gesture, the image display device 600 may further include the sensor unit (not shown) that has at least one of a touch sensor, a voice sensor, a position sensor, and a motion sensor, as stated before. A signal sensed by the sensor unit may be output to the controller 670 through the user input interface 650.

The image display device 600 may further include the camera unit (not shown) for capturing images of a user. Image information captured by the camera unit may be input to the controller 670.

The controller 670 may sense a user gesture from an image captured by the camera unit or a signal sensed by the sensor unit, or by combining the captured image and the sensed signal.

The power supply 690 supplies power to the image display device 600.

Particularly, the power supply 690 may supply power to the controller 670 which may be implemented as a System On Chip (SOC), the display 680 for displaying an image, and the audio output unit 685 for audio output.

For supplying power, the power supply 690 may include a converter (not shown) for converting Alternating Current (AC) into Direct Current (DC). If the display 680 is configured with, for example, a liquid crystal panel having a plurality of backlight lamps, the power supply 690 may further include an inverter (not shown) capable of performing Pulse Width Modulation (PWM) for luminance change or dimming driving.

The remote controller 611 transmits a user input to the user input interface 650. For transmission of user input, the remote controller 611 may use various communication techniques such as Bluetooth, RF communication, IR communication, Ultra Wideband (UWB) and ZigBee.

In addition, the remote controller 611 may receive a video signal, an audio signal or a data signal from the user input interface 650 and output the received signals visually, audibly or as vibrations.

The above-described image display device 600 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 600 illustrated in FIG. 6 is purely exemplary. Depending upon the specifications of the image display device 600 in actual implementation, the components of the image display device 600 may be combined or omitted or new components may be added. That is, two or more components may be incorporated into one component or one component may be configured as separate components, as needed. In addition, the function of each block is described for the purpose of describing the embodiment of the present disclosure and thus specific operations or devices should not be construed as limiting the scope and spirit of the present disclosure.

Unlike the configuration illustrated in FIG. 6, the image display device 600 may be configured so as to receive and play back video content through the network interface 630 or the external device interface 635, without the tuner 600 and the demodulator 620 shown in FIG. 6.

The game application according to the embodiment of the present disclosure is received through the network interface 630 of the image display device 600 shown in FIG. 6. Further, the received game application is stored in the memory 640.

The network interface 630 performs communication with a mobile device executing the above-described game application.

The image display device 600 is an exemplary image signal processing device that processes a stored image or an input image. Other examples of the image signal processing device include a set-top box without the display 680 and the audio output unit 685, a DVD player, a Blu-ray player, a game console, and a computer. The set-top box will be described later with reference to FIGS. 7 and 8.

Figure 7:
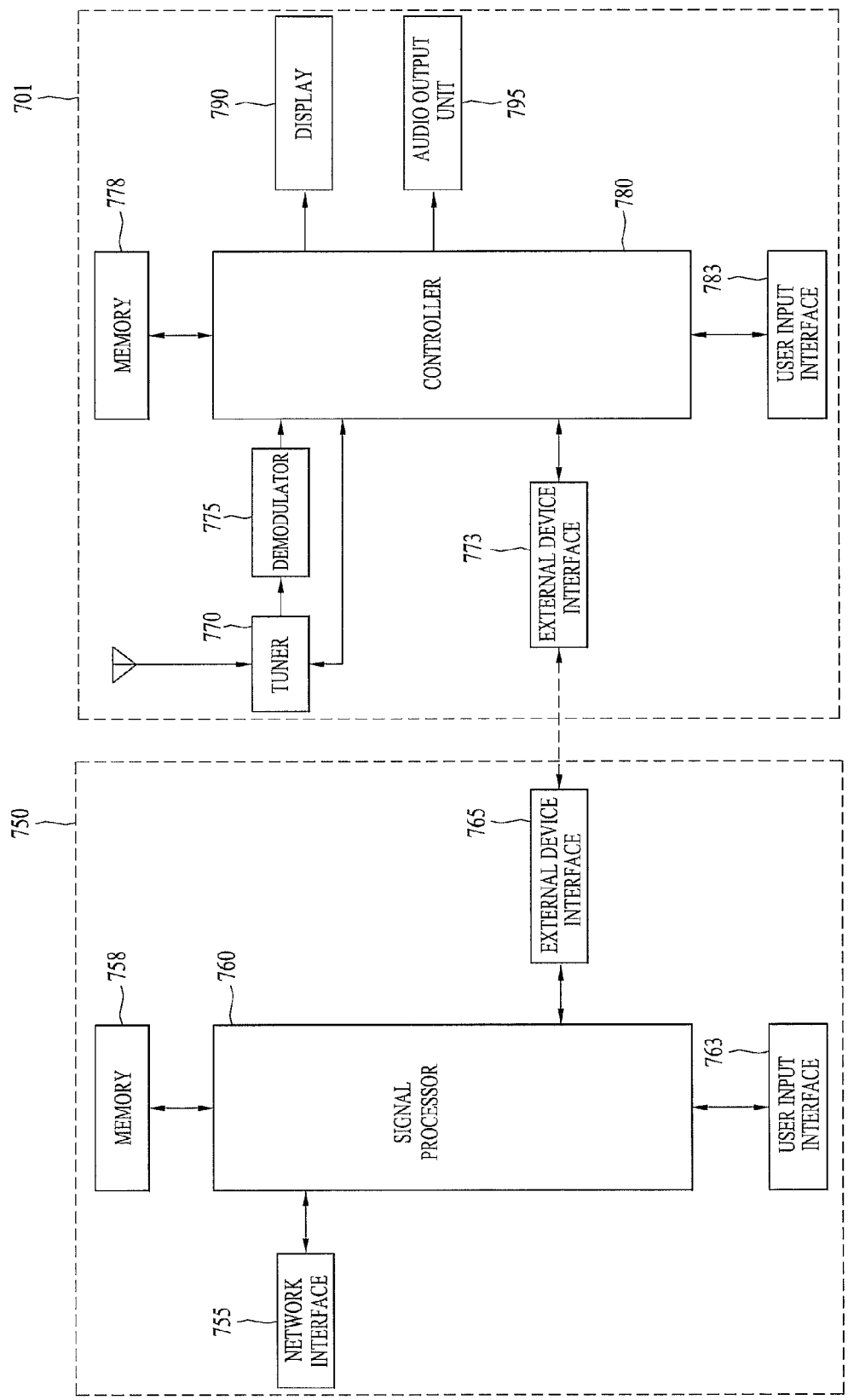
FIGS. 7 and 8 are diagrams showing any one of the image display devices separately as a set-top box and a display device according to embodiments of the present disclosure.
Figure 8:
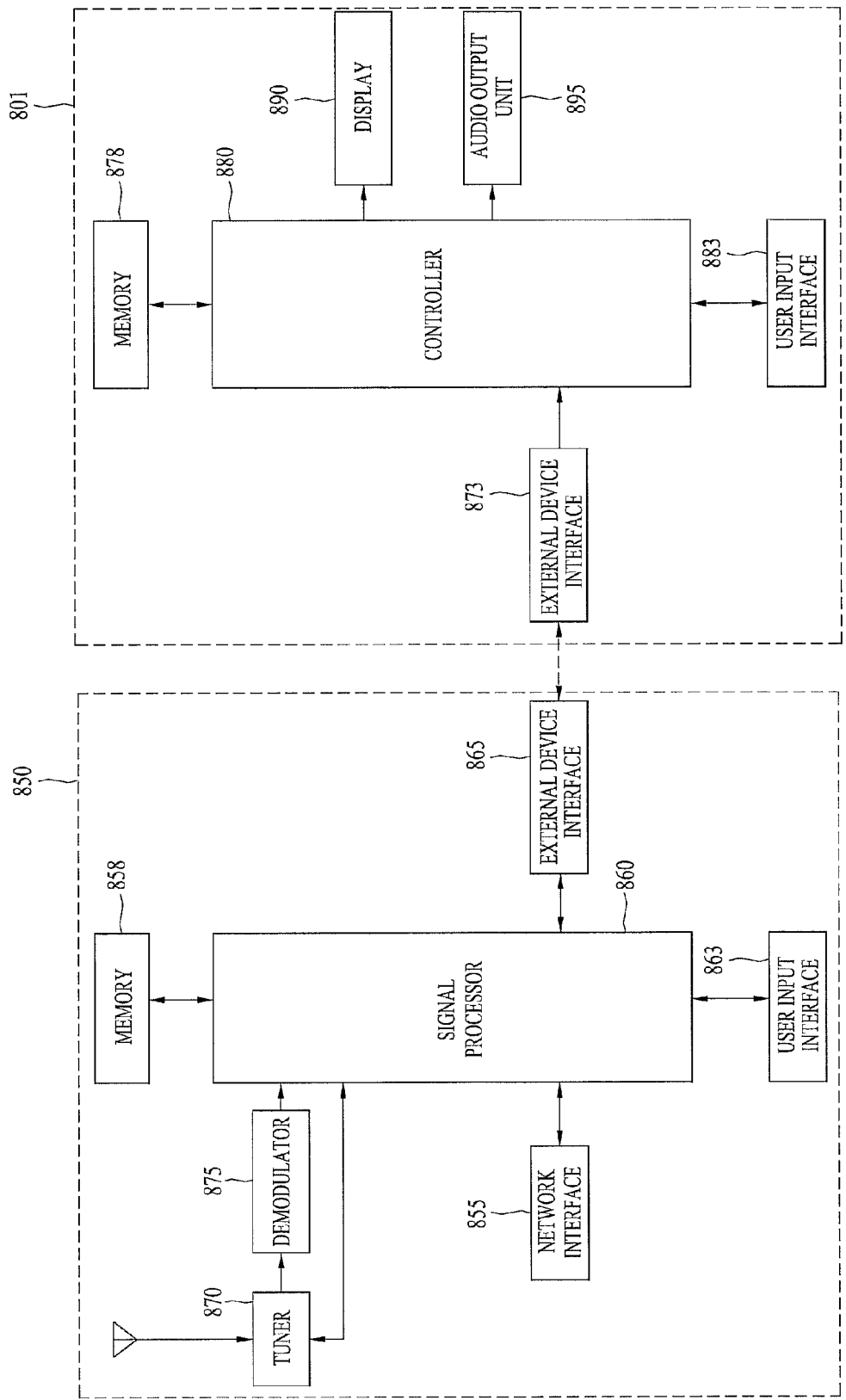

FIGS. 7 and 8 are diagrams illustrating any one of the image display devices separately as a set-top box and a display device according to embodiments of the present disclosure.

Referring to FIG. 7, a set-top box 750 and a display device 701 may transmit or receive data wirelessly or by wire.

The set-top box 750 may include a network interface 755, a memory 758, a signal processor 760, a user input interface 763, and an external device interface 765.

The network interface 755 serves as an interface between the set-top box 750 and a wired/wireless network such as the Internet. The network interface 755 may transmit data to or receive data from another user or another electronic device over a connected network or over another network linked to the connected network.

The memory 758 may store programs necessary for the signal processor 760 to process and control signals and temporarily store a video, audio and/or data signal received from the external device interface 765 or the network interface 755. The memory 758 may also store platforms shown in FIGS. 11 and 12, as described later.

The signal processor 760 processes an input signal. For example, the signal processor 760 may demultiplex or decode an input video or audio signal. For signal processing, the signal processor 760 may include a video decoder or an audio decoder. The processed video or audio signal may be transmitted to the display device 701 through the external device interface 265.

The user input interface 763 transmits a signal received from the user to the signal processor 760 or a signal received from the signal processor 760 to the user. For example, the user input interface 763 may receive various control signals such as a power on/off signal, an operation input signal, and a setting input signal through a local key (not shown) or the remote controller and output the control signals to the signal processor 760.

The external device interface 765 serves as an interface between the set-top box 750 and an external device that is connected wirelessly or by wire, particularly the display device 701, for data transmission or reception. The external device interface 765 may also interface with an external device such as a game console, a camera, a camcorder, and a computer (e.g. a laptop computer), for data transmission or reception.

The set-top box 750 may further include a media input unit for media playback. The media input unit may be a Blu-ray input unit (not shown), for example. That is, the set-top box 750 may include a Blu-ray player. After signal processing such as demultiplexing or decoding in the signal processor 760, a media signal from a Blu-ray disc may be transmitted to the display device 701 through the external device interface 765 so as to be displayed on the display device 701.

The display device 701 may include a tuner 770, an external device interface 773, a demodulator 775, a memory 778, a controller 780, a user input interface 783, a display 790, and an audio output unit 795.

The tuner 770, the demodulator 775, the memory 778, the controller 780, the user input interface 783, the display 790 and the audio output unit 795 are identical respectively to the tuner 610, the demodulator 620, the memory 640, the controller 670, the user input interface 650, the display 680, and the audio output unit 685 illustrated in FIG. 6 and thus a description thereof is not provided herein.

The external device interface 773 serves as an interface between the display device 701 and a wireless or wired external device, particularly the set-top box 750, for data transmission or reception.

Hence, a video signal or an audio signal received through the set-top box 750 is output through the display 790 or through the audio output unit 795 under control of the controller 780.

Referring to FIG. 8, the configuration of the set-top box 850 and the display device 801 shown in FIG. 8 is similar to that of the set-top box 750 and the display device 701 shown in FIG. 7, except that the tuner 870 and the demodulator 875 reside in the set-top box 850, not in the display device 801.

Thus the following description will focus upon such difference.

The signal processor 860 may process a broadcast signal received through the tuner 870 and the demodulator 875. The user input interface 863 may receive a channel selection input, a channel store input, etc.

Figure 9:
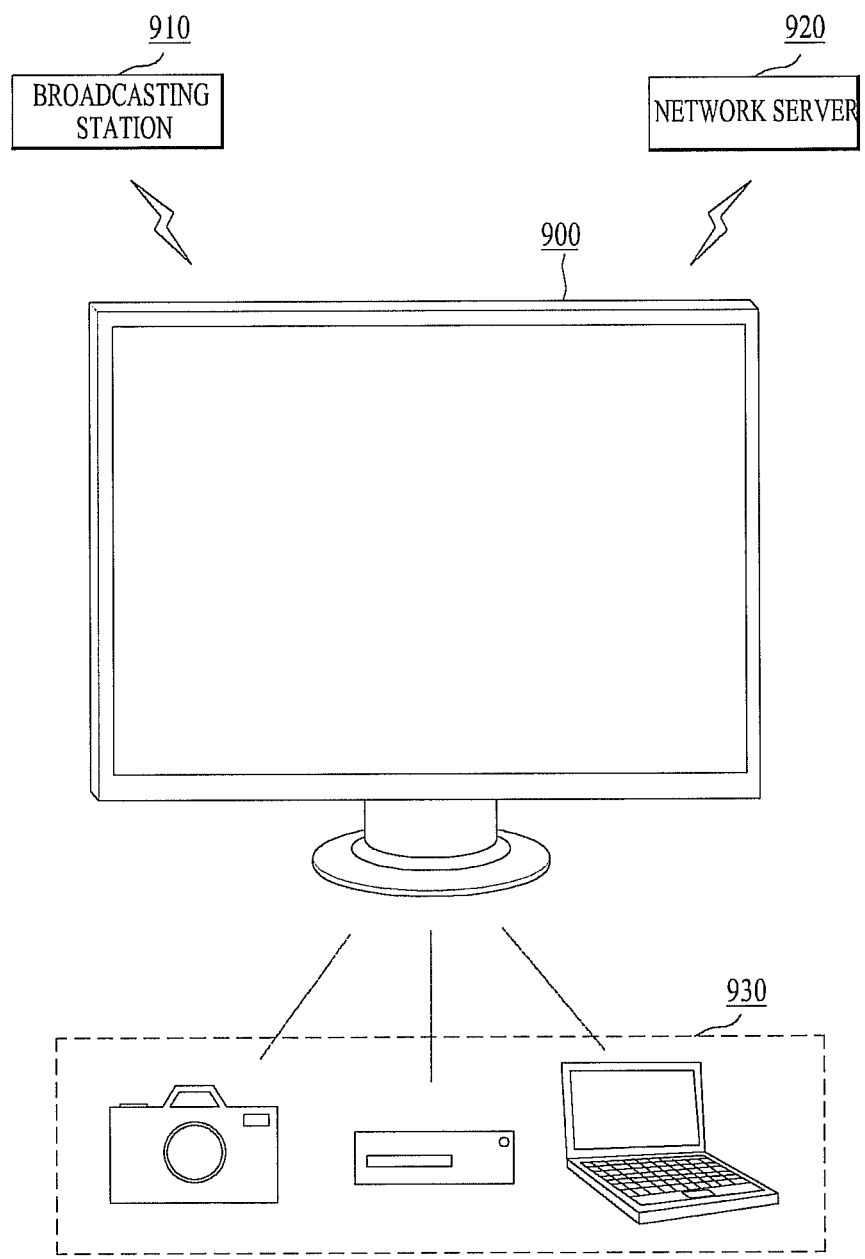
FIG. 9 is a diagram illustrating an operation for communicating with third devices in either of the image display devices according to the embodiments of the present disclosure.

FIG. 9 is a diagram illustrating an operation for communicating with third devices in either of the image display devices according to the embodiments of the present disclosure. The image display device shown in FIG. 9 may be one of the above-described image display devices according to the embodiments of the present disclosure.

As shown in FIG. 9, the image display device 900 according to the embodiment of the present disclosure may communicate with a broadcast station 910, a network server 920, or an external device 930.

The image display device 900 may receive a broadcast signal including a video signal from the broadcast station 910. The image display device 900 may process the audio and video signals of the broadcast signal or the data signal of the broadcast signal, suitably for output from the image display device 900. The image display device 900 may output video or audio based on the processed video or audio signal.

Meanwhile, the image display device 900 may communicate with the network server 920. The network server 920 is capable of transmitting signals to and receiving signals from the image display device 900 over a network.

For example, the network server 920 may be a portable terminal that can be connected to the image display device 900 through a wired or wireless base station. In addition, the network server 920 may provide content to the image display device 900 over the Internet. A CP may provide content to the image display device 900 through the network server.

The image display device 900 may communicate with the external device 930. The external device 930 can transmit and receive signals directly to and from the image display device 900 wirelessly or by wire. For instance, the external device 930 may be a media storage or player. That is, the external device 930 may be any of a camera, a DVD player, a Blu-ray player, a PC, etc.

The broadcast station 910, the network server 920 or the external device 930 may transmit a signal including a video signal to the image display device 900. The image display device 900 may display an image based on the video signal included in the received signal. Also, the image display device 900 may transmit a signal transmitted from the network server 920 to the broadcast station 910 to the external device 930 and may transmit a signal transmitted from the external device 930 to the image display device 900 to the broadcast station 910 or the network server 920. That is, the image display device 900 may transmit content included in signals received from the broadcast station 910, the network server 920, and the external device 930 or may immediately play back the content.

Figure 10:
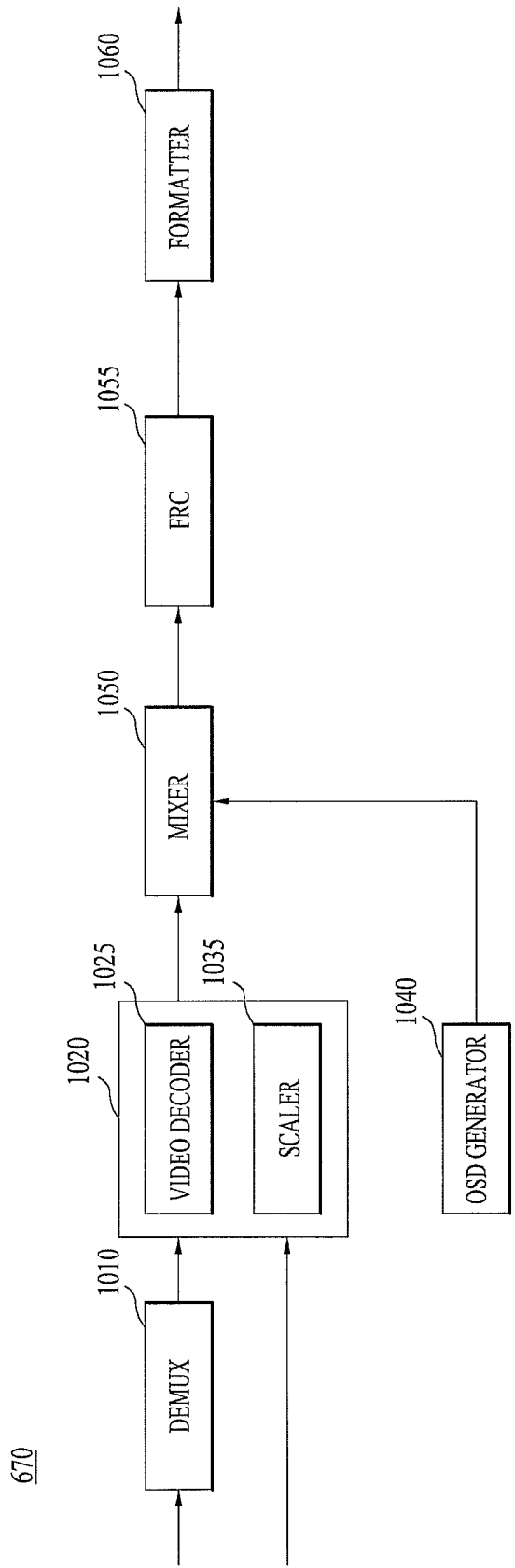
FIG. 10 is a block diagram of a controller shown in FIG. 6.

FIG. 10 is a block diagram of the controller shown in FIG. 6. The controller will be described with reference to FIGS. 10 and 6.

The controller 670 may include a DEMUX 1010, a video processor 1020, an OSD generator 1040, a mixer 1050, a Frame Rate Converter (FRC) 1055, and a formatter 1060 according to an embodiment of the present disclosure. The controller 670 may further include an audio processor (not shown) and a data processor (not shown).

The DEMUX 1010 demultiplexes an input stream. For example, the DEMUX 1010 may demultiplex an MPEG-2 TS into a video signal, an audio signal, and a data signal. The stream signal input to the DEMUX 1010 may be received from the tuner 610, the demodulator 620 or the external device interface 635.

The video processor 1020 may process the demultiplexed video signal.

For video signal processing, the video processor 1020 may include a video decoder 1025 and a scaler 1035.

The video decoder 1025 decodes the demultiplexed video signal and the scaler 1035 scales the decoded video signal so that the video signal can be displayed on the display 680.

The video decoder 1025 may be provided with decoders that operate based on various standards.

If the demultiplexed video signal is, for example, an MPEG-2 encoded video signal, the video signal may be decoded by an MPEG-2 decoder.

On the other hand, if the video signal is an H.264-encoded DMB or DVB-handheld (DVB-H) signal, the video signal may be decoded by an H.264 decoder.

The video signal decoded by the video processor 1020 is provided to the mixer 1050.

The OSD generator 1040 generates an OSD signal autonomously or according to user input. For example, the OSD generator 1040 may generate signals by which a variety of information is displayed as graphics or text on the display 680, based on control signals received from the user input interface 650. The generated OSD signal may include various data such as a UI screen, a variety of menu screens, widgets, icons, etc. of the image display device 600

For example, the OSD generator 1040 may generate a signal by which subtitles are displayed for a broadcast image or Electronic Program Guide (EPG)-based broadcasting information.

The mixer 1050 may mix the decoded video signal processed by the image processor with the OSD signal generated by the OSD generator 1040 and output the mixed signal to the formatter 1060. As the decoded broadcast video signal or the externally input signal is mixed with the OSD signal, an OSD may be overlaid on the broadcast image or the externally input image.

The FRC 1055 may change the frame rate of an input image signal. For example, a frame rate of 60 Hz is converted into a frame rate of 120 or 240 Hz. When the frame rate is to be changed from 60 Hz to 120 Hz, a first frame is inserted between the first frame and a second frame, or a predicted third frame is inserted between the first and second frames. If the frame rate is to be changed from 60 Hz to 240 Hz, three identical frames or three predicted frames are inserted between the first and second frames. It is also possible to maintain the frame rate of the input image without frame rate conversion.

The formatter 1060 changes the format of the signal received from the FRC 355 to suit the display 680. For example, the formatter 1060 may convert a received signal into an RGB data signal. The RGB signal may be output in the form of a Low Voltage Differential Signal (LVDS) or mini-LVDS.

The audio processor (not shown) of the controller 670 may process the demultiplexed audio signal. For audio signal processing, the audio processor (not shown) may have a plurality of decoders.

If the demultiplexed audio signal is a coded audio signal, the audio processor (not shown) of the controller 670 may decode the audio signal. For example, the demultiplexed audio signal may be decoded by an MPEG-2 decoder, an MPEG-4 decoder, an Advanced Audio Coding (AAC) decoder, or an AC-3 decoder.

The audio processor (not shown) of the controller 670 may also adjust the bass, treble or volume of the audio signal.

The data processor (not shown) of the controller 670 may process the demultiplexed data signal. For example, if the demultiplexed data signal is an encoded data signal such as an Electronic Program Guide (EPG) which includes broadcast information specifying the start time, end time, etc. of scheduled broadcast programs of each channel, the controller 670 may decode the data signal. Examples of an EPG include ATSC-Program and System Information Protocol (PSIP) information and DVB-Service Information (SI).

ATSC-PSIP information or DVB-SI may be included in the header of the above-described TS, i.e., a 4-byte header of an MPEG-2 TS.

The block diagram of the controller 670 shown in FIG. 10 is an embodiment of the present disclosure. Depending upon the specifications of the controller 670, the components of the controller 670 may be combined, or omitted. Or new components may be added to the controller 670.

Figure 11:
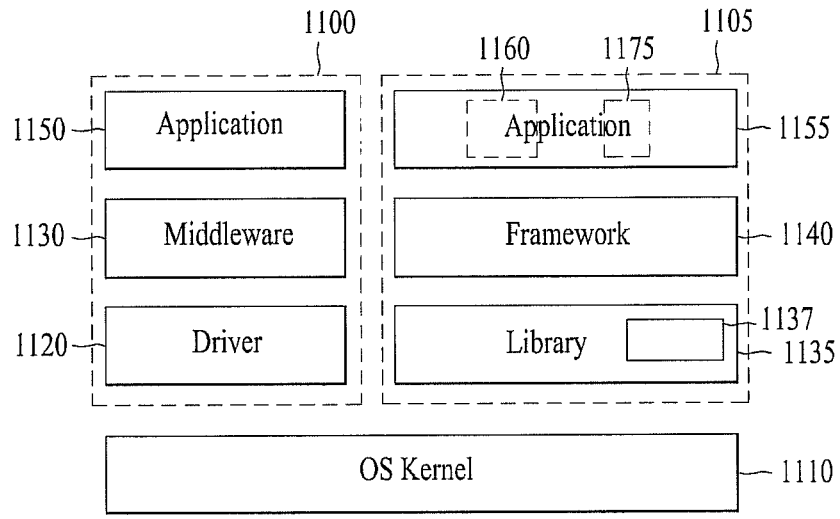
FIG. 11 is a diagram showing an example of a platform architecture for either of the image display devices according to the embodiments of the present disclosure.

FIG. 11 is a diagram showing an example of a platform architecture for either of the image display devices according to the embodiments of the present disclosure.

Figure 12:
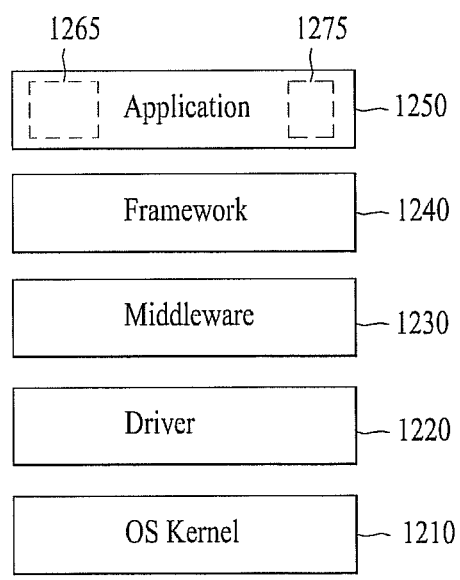
FIG. 12 is a diagram showing another example of a platform architecture for either of the image display devices according to the embodiments of the present disclosure.

FIG. 12 is a diagram showing another example of a platform architecture for either of the image display devices according to the embodiments of the present disclosure.

A platform for either of the image display devices according to the embodiments of the present disclosure may have OS-based software to implement the above-described various operations.

Referring to FIG. 11, a platform for either of the image display devices according to the embodiments of the present disclosure is of a separate type. The platform may be designed separately as a legacy system platform 1100 and a smart system platform 1105. An OS kernel 1110 may be shared between the legacy system platform 1100 and the smart system platform 405.

The legacy system platform 1100 may include a stack of a driver 1120, middleware 1130, and an application layer 1150 on the OS kernel 1110.

On the other hand, the smart system platform 1105 may include a stack of a library 1135, a framework 1140, and an application layer 1155 on the OS kernel 1110.

The OS kernel 1110 is the core of an operating system. When the image display device is driven, the OS kernel 1110 may be responsible for operation of at least one of control of hardware drivers, security protection for hardware and processors in the image display device, efficient management of system resources, memory management, hardware interfacing by hardware abstraction, multi-processing, or scheduling associated with multi-processing. Meanwhile, the OS kernel 1110 may further perform power management.

The hardware drivers of the OS kernel 1110 may include, for example, at least one of a display driver, a Wi-Fi driver, a Bluetooth driver, a USB driver, an audio driver, a power manager, a binder driver, or a memory driver.

Alternatively or additionally, the hardware drivers of the OS kernel 1110 may be drivers for hardware devices within the OS kernel 1110. The hardware drivers may include a character device driver, a block device driver, and a network device driver. The block device driver may require a buffer for buffering data on a block basis, because data is transmitted on a block basis. The character device driver may not need a buffer since data is transmitted on a basic data unit basis, that is, on a character basis.

The OS kernel 1110 may be implemented based on any of various OSs such as Unix (Linux or MAC OS), Windows, etc. The OS kernel 1110 may be a general-purpose open-source kernel which can be implemented in other electronic devices.

The driver 1120 is interposed between the OS kernel 1110 and the middleware 1130. Along with the middleware 1130, the driver 1120 drives devices for operation of the application layer 1150. For example, the driver 1120 may include a driver(s) for a microcomputer, a display module, a Graphics Processing Unit (GPU), an FRC, a General-Purpose Input/Output (GPIO) pin, a High-Definition Multimedia Interface (HDMI), a System Decoder (SDEC) or DEMUX, a Video Decoder (VDEC), an Audio Decoder (ADEC), a Personal Video Recorder (PVR), and/or an Inter-Integrated Circuit (I2C). These drivers operate in conjunction with the hardware drivers of the OS kernel 1110.

In addition, the driver 1120 may further include a driver for the remote controller, especially a pointing device to be described below. The remote controller driver may reside in the OS kernel 1110 or the middleware 1130, instead of the driver 1120.

The middleware 1130 resides between the OS kernel 1110 and the application layer 1150. The middleware 1130 may mediate between different hardware devices or different software programs, for data transmission and reception between the hardware devices or the software programs. Therefore, the middleware 1130 can provide standard interfaces, support various environments, and enable interaction between tasks conforming to heterogeneous communication protocols.

Examples of the middleware 1130 in the legacy system platform 1100 may include Multimedia and Hypermedia information coding Experts Group (MHEG) and Advanced Common Application Platform (ACAP) as data broadcasting-related middleware, PSIP or SI middleware as broadcasting information-related middleware, and DLNA middleware as peripheral device communication-related middleware.

The application layer 1150 that runs atop the middleware 1130 in the legacy system platform 1100 may include, for example, UI applications associated with various menus in the image display device. The application layer 1150 on top of the middleware 1130 may allow editing and updating over a network by user selection. Through the application layer 1150, the user may navigate a desired menu by manipulating the remote controller while viewing a broadcast program.

The application layer 1150 in the legacy system platform 1100 may further include at least one of a TV guide application, a Bluetooth application, a reservation application, a Digital Video Recorder (DVR) application, and a hotkey application.

In the smart system platform 1105, the library 1135 is positioned between the OS kernel 1110 and the framework 1140, forming the basis of the framework 1140. For example, the library 1135 may include Secure Socket Layer (SSL) (a security-related library), WebKit (a Web engine-related library), c library (libc), and Media Framework (a media-related library) specifying, for example, a video format and an audio format. The library 1135 may be written in C or C++. Also, the library 1135 may be exposed to a developer through the framework 1140.

The library 1135 may include a runtime 1137 with a core Java library and a Virtual Machine (VM). The runtime 1137 and the library 1135 form the basis of the framework 1140.

The VM may be a virtual machine that enables concurrent execution of a plurality of instances, that is, multi-tasking. For each application of the application layer 1155, a VM may be allocated and executed. For scheduling or interconnection between the plurality of instances, the binder driver (not shown) of the OS kernel 1110 may operate.

The binder driver and the runtime 1137 may connect Java applications to C-based libraries.

The library 1135 and the runtime 1137 may correspond to the middleware 1130 of the legacy system platform.

In the smart system platform 1105, the framework 1140 includes programs on which applications of the application layer 1155 are based. The framework 1140 is compatible with any application and may allow component reuse, movement or exchange. The framework 1140 may include supporting programs and programs for interconnecting different software components. For example, the framework 1140 may include an activity manager related to activities of applications, a notification manager, and a CP for abstracting common information between applications. This framework 1140 may be written in Java.

The application layer 1155 on top of the framework 1140 includes a variety of programs that can be executed and displayed in the image display device. The application layer 1155 may include, for example, a core application that is a suite providing at least one of e-mail, Short Message Service (SMS), calendar, map, or browser functions. The application layer 1155 may be written in Java.

In the application layer 1155, applications may be categorized into user-undeletable applications 1165 stored in the image display device or user-deletable applications 1175 that are downloaded from an external device or a network and stored in the image display device.

Using the applications of the application layer 1155, a variety of functions such as an Internet telephony service, VoD service, Web album service, Social Networking Service (SNS), Location-Based Service (LBS), map service, Web browsing service, and application search service may be performed through network access. In addition, other functions such as gaming and schedule management may be performed by the applications.

Referring to FIG. 12, a platform for any of the image display devices according to the embodiments of the present disclosure is of an integrated type. The integrated-type platform may include an OS kernel 1210, a driver 1220, middleware 1230, a framework 1240, and an application layer 1250.

The integrated-type platform shown in FIG. 12 is different from the separate-type platform shown in FIG. 11 in that the library 1135 shown in FIG. 11 is deleted and the application layer 1250 is included as an integrated layer. The driver 1220 and the framework 1240 correspond to the driver 1120 and the framework 1140 of FIG. 11, respectively.

The library 1135 of FIG. 11 may be incorporated into the middleware 1230 of FIG. 12. That is, the middleware 1230 may include both the legacy system middleware and the image display system middleware. As described before, the legacy system middleware includes MHEG or ACAP as data broadcasting-related middleware, PSIP or SI middleware as broadcasting information-related middleware, and DLNA middleware as peripheral device communication-related middleware, and the image display system middleware includes SSL as a security-related library, WebKit as a Web engine-related library, libc, and Media Framework as a media-related library. The middleware 1230 may further include the above-described runtime.

The application layer 1250 may include a menu-related application, a TV guide application, a reservation application, etc. as legacy system applications, and e-mail, SMS, a calendar, a map, and a browser as image display system applications.

In the application layer 1250, applications may be categorized into user-undeletable applications 1265 that are stored in the image display device and user-installable or user-deletable applications 1275 that are downloaded from an external device or a network and stored in the image display device.

The platforms shown in FIGS. 11 and 12 may be general-purpose ones that can be implemented in many other electronic devices as well as in image display devices. The platforms of FIGS. 11 and 12 may be stored or loaded in the memory 640, the controller 670, or any other processor (not shown) or may be stored or load in the SI & metadata DB 711, the UI manager 714 or the service manager 713 shown in FIG. 5. To execute applications, an additional application processor (not shown) may be further provided.

The game application according to the embodiment of the present disclosure is located in the application layer shown in FIG. 11 or 12.

In particular, if the game application is installed in a process of producing a display device (e.g., TV), the display device is designed such that a user of the display device may not arbitrarily access or delete the game application.

Figure 13:
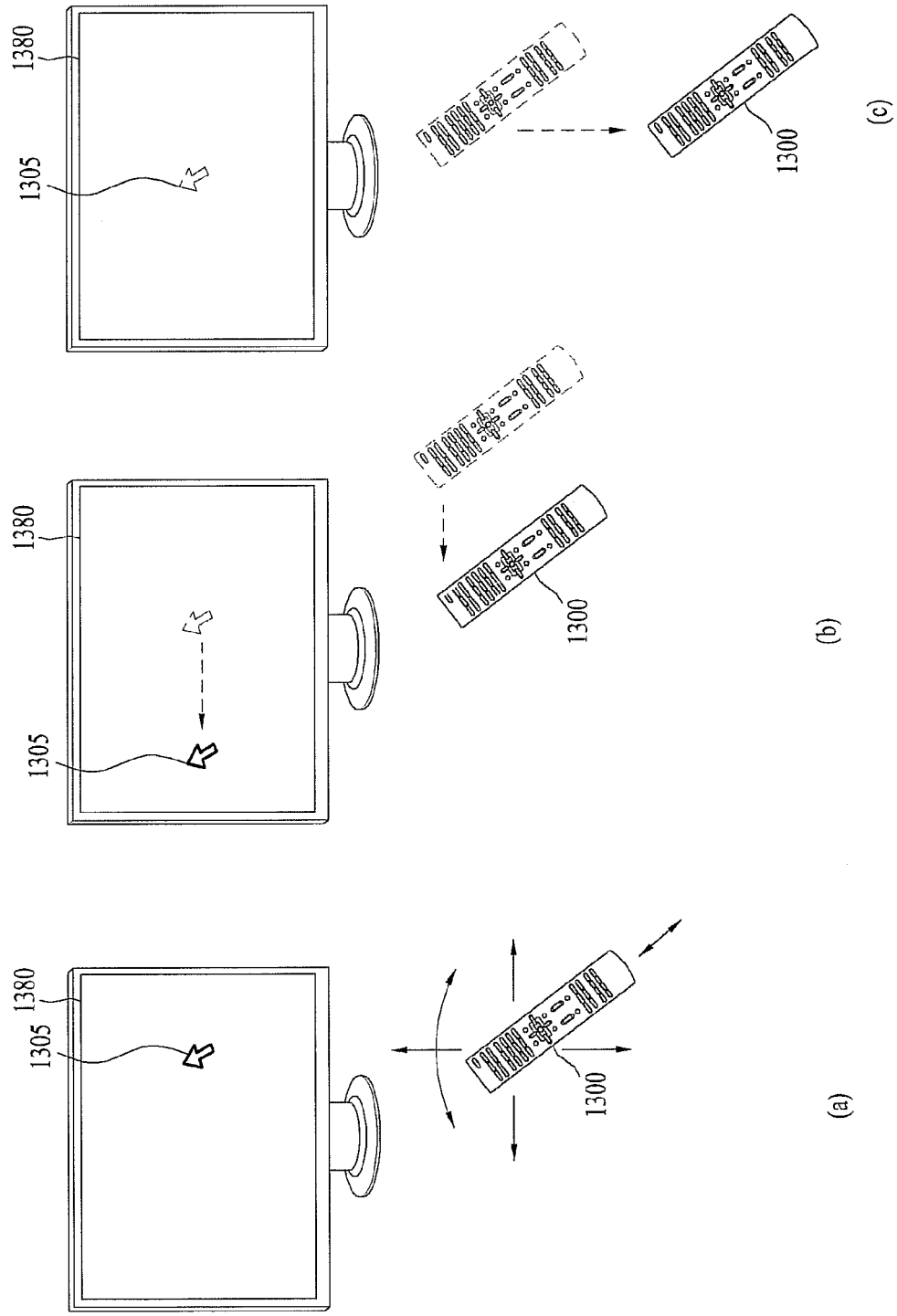
FIG. 13 is a diagram showing a method of operating a remote controller for controlling any one of the image display devices according to the embodiments of the present disclosure.

FIG. 13 illustrates a method for controlling either of the image display devices according to the embodiments of the present disclosure using a remote controller.

FIG. 13(*a*) illustrates a pointer 1305 representing movement of the remote controller 1300 displayed on the display 1380.

The user may move or rotate the remote controller 1300 up and down, side to side (FIG. 13(*b*)), and back and forth (FIG. 13(*c*)). The pointer 1305 displayed on the display 1380 of the image display device moves according to the movement of the remote controller 1300. Since the pointer 1305 moves in accordance with the movement of the remote controller 1300 in a 3D space as shown in FIG. 13, the remote controller 1300 may be referred to as a pointing device.

Referring to FIG. 13(*b*), if the user moves the remote controller 1300 to the left, the pointer 1305 moves to the left on the display 1380.

A sensor of the remote controller 1300 detects movement of the remote controller 1300 and transmits motion information of the remote controller 1300 to the image display device. Then, the image display device calculates the coordinates of the pointer 1305 from the motion information of the remote controller 1300. The image display device then displays the pointer 1305 at the calculated coordinates.

Referring to FIG. 13(*c*), while pressing a predetermined button of the remote controller 1300, the user moves the remote controller 1300 away from the display 1380. Then, a selected area corresponding to the pointer 1305 may be zoomed in on and enlarged on the display 1380. On the contrary, if the user moves the remote controller 1300 toward the display 180, the selected area corresponding to the pointer 1305 is zoomed out and thus contracted on the display 1380. On the contrary, when the remote controller 1300 moves away from the display 1380, the selected area may be zoomed out and when the remote controller 1300 approaches the display 180, the selected area may be zoomed in.

With the predetermined button of the remote controller 1300 pressed, the up, down, left and right movements of the remote controller 1300 may be ignored. That is, when the remote controller 1300 moves away from or approaches the display 1380, only the back and forth movements of the remote controller 1300 are sensed, while the up, down, left and right movements of the remote controller 1300 are ignored. Unless the predetermined button is pressed in the remote controller 1300, the pointer 1305 moves in accordance with the up, down, left or right movement of the remote controller 1300.

The movement speed and direction of the pointer 1305 may correspond to the movement speed and direction of the remote controller 1300.

The pointer of the present specification is an object displayed on the display 1380 in correspondence with the movement of the remote controller 1300. Therefore, the pointer 1305 may have various shapes other than the arrow illustrated in FIG. 13. For example, the pointer 1305 may be a dot, a cursor, a prompt, a thick outline, etc. The pointer 1305 may be displayed across a plurality of points, such as a line and a surface, as well as at a single point on horizontal and vertical axes.

Figure 14:
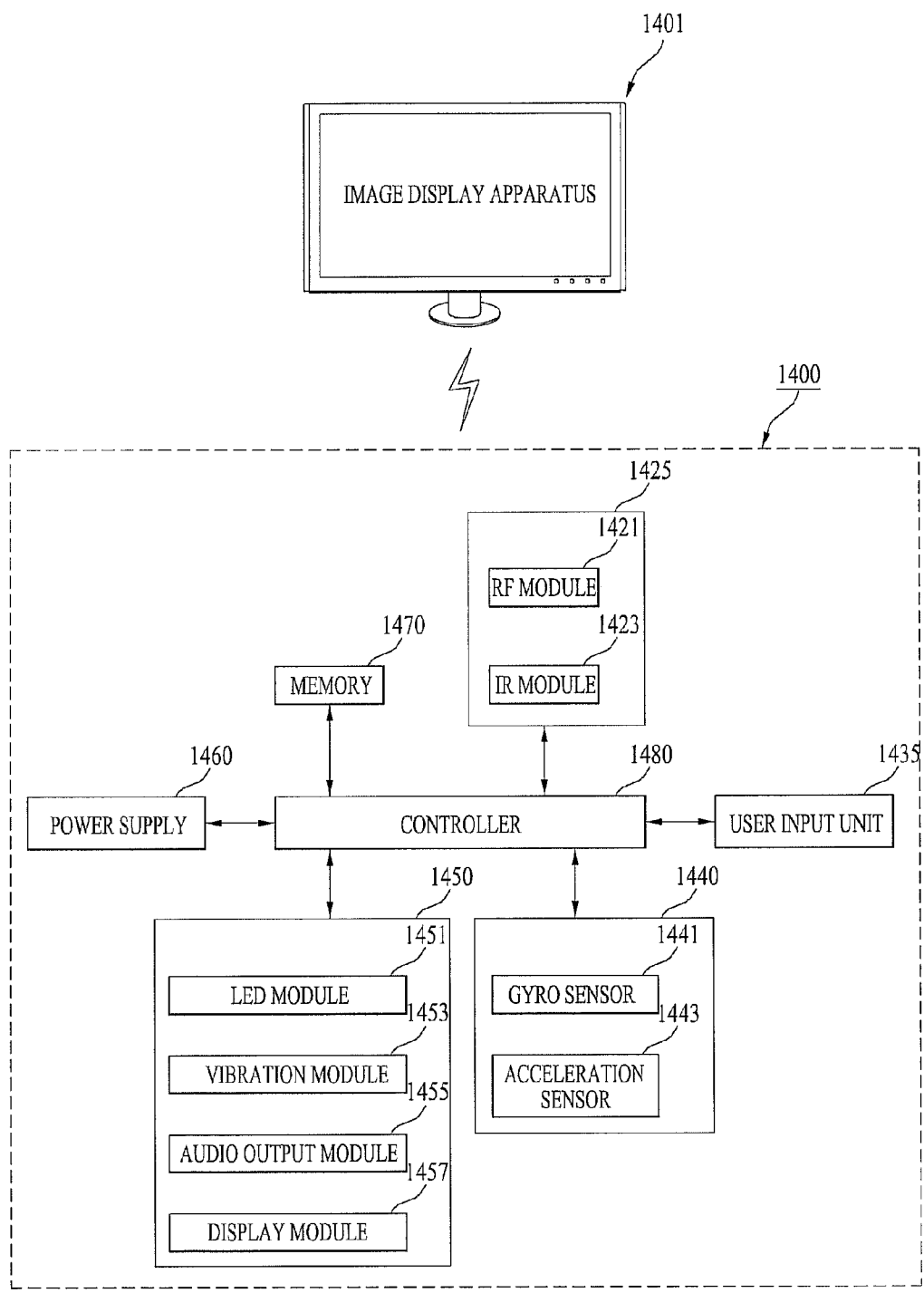
FIG. 14 is a block diagram of a remote controller for controlling either of the image display devices according to the embodiments of the present disclosure.

FIG. 14 is a detailed block diagram of the remote controller in either of the image display devices according to an embodiment of the present disclosure.

Referring to FIG. 14, the remote controller 1400 may include a wireless communication module 1425, a user input unit 1435, a sensor unit 1440, an output unit 1450, a power supply 1460, a memory 1470, and a controller 1480.

The wireless communication module 1425 transmits signals to and/or receives signals from either of the above-described image display devices according to the embodiments of the present disclosure, that is, the image display device 1401.

The remote controller 1400 may include an RF module 1421 for transmitting RF signals to and/or receiving RF signals from the image display device 1401 according to an RF communication standard. The remote controller 1400 may also include an IR module 1423 for transmitting IR signals to and/or receiving IR signals from the image display device 1401 according to an IR communication standard.

In the present embodiment, the remote controller 1400 transmits motion information representing movement of the remote controller 1400 to the image display device 1401 through the RF module 221.

The remote controller 1400 may also receive signals from the image display device 1401 through the RF module 1421. As needed, the remote controller 1400 may transmit commands such as a power on/off command, a channel switch command, or a volume change command to the image display device 1401 through the IR module 1423.

The user input unit 1435 may include a keypad, a plurality of buttons, a touchpad and/or a touchscreen. The user may enter commands associated with the image display device 1401 to the remote controller 1400 by manipulating the user input unit 1435. If the user input unit 1435 includes a plurality of hard buttons, the user may input various commands associated with the image display device 1401 to the remote controller 1400 by pressing the hard buttons. Alternatively or additionally, if the user input unit 1435 includes a touchscreen displaying a plurality of soft keys, the user may input various commands associated with the image display device 1401 to the remote controller 1400 by touching the soft keys. The user input unit 1435 may also include various input tools other than those set forth herein, such as a scroll key and/or a jog wheel, which should not be construed as limiting the present disclosure.

The sensor unit 1440 may include a gyro sensor 241 and/or an acceleration sensor 1443.

The gyro sensor 1441 may sense movement of the remote controller 1400.

For example, the gyro sensor 1441 may sense movement of the remote controller 1400 in X, Y, and Z-axis directions. The acceleration sensor 1443 may sense the speed of the remote controller 1400. The sensor unit 1440 may further include a distance sensor for sensing the distance between the remote controller 1400 and the display device 1401.

The output unit 1450 may output a video and/or audio signal corresponding to manipulation of the user input unit 1435 or corresponding to a signal received from the image display device 1401. The user may easily identify whether the user input unit 1435 has been manipulated or whether the image display device 1401 has been controlled, based on the video and/or audio signal output by the output unit 1450.

The output unit 1450 may include a Light Emitting Diode (LED) module 1451 which is turned on or off whenever the user input unit 1435 is manipulated or whenever a signal is received from or transmitted to the image display device 1401 through the wireless communication module 1425, a vibration module 1453 which generates vibrations, an audio output module 1455 which outputs audio data, and/or a display module 1457 which outputs video data.

The power supply 1460 supplies power to the remote controller 1400. If the remote controller 1400 remains stationary for a predetermined time or longer, the power supply 1460 may, for example, reduce or shut off supply of power to the spatial remote controller 1400 in order to save power. The power supply 1460 may resume power supply if a predetermined key of the remote controller 1400 is manipulated.

The memory 1470 may store various types of programs and application data necessary to control or drive the remote controller 1400. The remote controller 1400 may wirelessly transmit signals to and/or receive signals from the image display device 1401 over a predetermined frequency band with the aid of the RF module 1421. The controller 1480 of the remote controller 1400 may store information regarding the frequency band used for the remote controller 1400 to wirelessly transmit signals to and/or wirelessly receive signals from the paired image display device 1401 in the memory 1470, for later use.

The controller 1480 provides overall control to the remote controller 1400. The controller 1480 may transmit a signal corresponding to a key manipulation detected from the user input unit 1435 or a signal corresponding to motion of the remote controller 1400, as sensed by the sensor unit 1440, to the image display device 1401.

In association with the embodiments of the present disclosure, the remote controller 1400 may correspond to a user terminal necessary to execute a game application.

Accordingly, in association with gaming by the game application of the present disclosure, a signal input through the user input unit 1435 of the remote controller 1400 is analyzed by the controller 1480 and is transmitted to the image display device through the wireless communication module 1425, thereby being applied to the played game. That is, the game may be played by controlling a card or a pointer displayed on the image display device.

In the embodiment, the remote controller may determine a distance between the image display device and the remote controller using the wireless communication module 1425 or the distance sensor (not shown). If the remote controller moves away from the image display device, a game main screen displayed on the image display device is enlarged and, if the remote controller approaches the image display device, the game main screen is reduced. Enlargement and reduction may be inversely controlled according to user setting.

In another embodiment, enlargement and reduction may be performed only when the distance between the remote controller and the image display apparatus is changed in a state in which a predetermined button of the remote controller 1400 is pressed.

Figure 15:
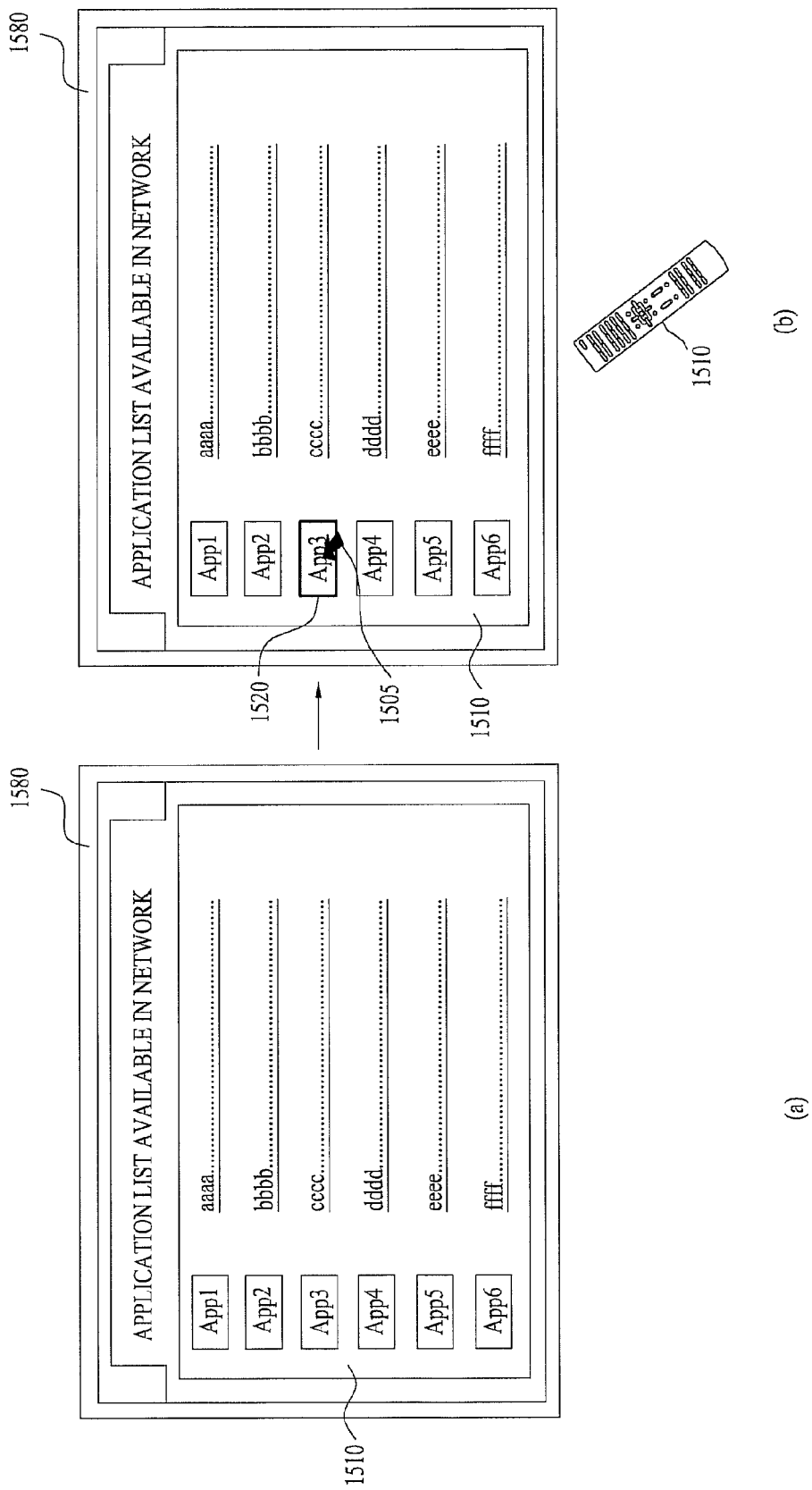
FIG. 15 is a diagram showing a first embodiment of a user interface (UI) in either of the image display devices according to the embodiments of the present disclosure.

FIG. 15 is a diagram showing a first embodiment of a UI in either of the image display devices according to embodiments of the present disclosure.

Figure 16:
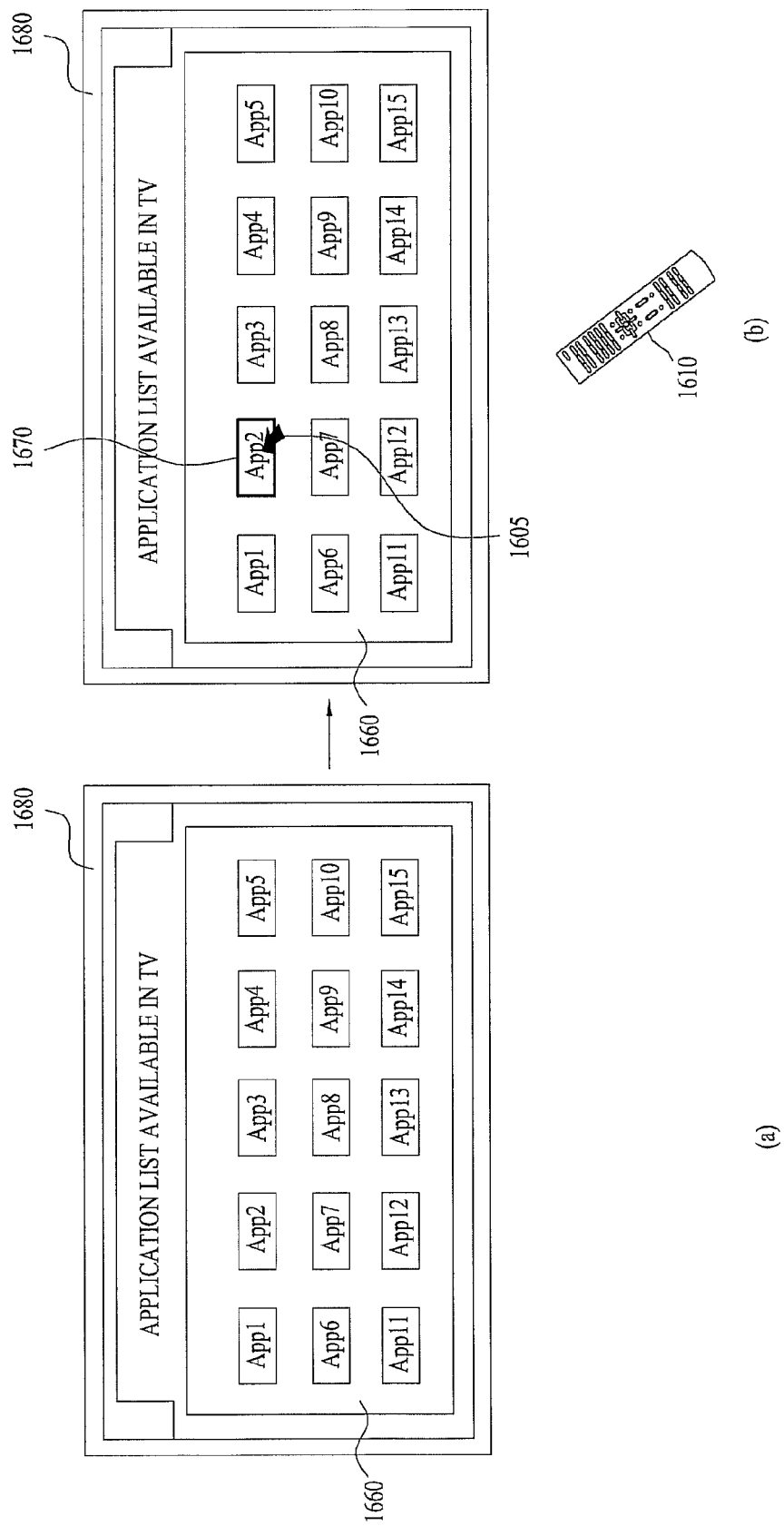
FIG. 16 is a diagram showing a second embodiment of a UI in either of the image display devices according to the embodiments of the present disclosure.

FIG. 16 is a diagram showing a second embodiment of a UI in either of the image display devices according to the embodiments of the present disclosure.

FIG. 17 is a diagram showing a third embodiment of a UI in either of the image display devices according to the embodiments of the present disclosure.

FIG. 18 is a diagram showing a fourth embodiment of a UI in either of the image display devices according to the embodiments of the present disclosure.

Referring to FIG. 15, an application list received over a network is displayed on the display 1580. A user may directly access a CP or an NP, search for various applications, and download the applications from the CP or the NP.

Specifically, FIG. 15(*a*) illustrates an application list 1510 available in a connected server, displayed on the display 180. The application list 1510 may include an icon representing each application and a brief description of the application. Because each of the image display devices according to the embodiments of the present disclosure is capable of full browsing, it may enlarge the icons or descriptions of applications received from the connected server on the display 1580. Accordingly, the user can readily identify applications.

FIG. 15(*b*) illustrates selection of one application 1520 from the application list 1510 using the pointer 1505 of the remote controller 1510.

Thus, the selected application 1520 may be easily downloaded.

In association with the embodiment of the present disclosure, a game application according to the present disclosure may be included in the application list 1510.

The game application included in the application list 1510 may include a game application for performing a game play process and providing a display screen to the image display device and a game application for performing a user control function necessary to play a game.

Accordingly, a user may select a game application according to the embodiment of the present disclosure from the application list 1510 and download the game application to the image display device or the user terminal.

FIG. 16 illustrates an application list of the image display device, displayed on the display 1680. Referring to FIG. 16(*a*), when the user selects an application list view menu by manipulating the remote controller 1610, a list of applications 1660 stored in the image display device according to each of the embodiments of the present disclosure is displayed on the display 1680. While only icons representing the applications are shown in FIG. 16, the application list 1660 may further include brief descriptions of the applications, like the application list illustrated in FIG. 15. Therefore, the user can readily identify the applications.

FIG. 16(*b*) illustrates selection of one application 1670 from the application list 1660 using the pointer 1205 of the remote controller 1610.

Thus, the selected application 1670 may be easily executed.

While it is shown in FIG. 16 that the user selects a desired item by moving the pointer 1605 using the remote controller 1610, the application may be selected in many other ways. For example, the user may select a specific item using a cursor displayed on the screen by combined input of an OK key and a direction key of a local key (not shown) or the remote controller 1610.

In another example, if the remote controller has a touch pad, the pointer 1605 moves on the display 1680 according to touch input of the touch pad. Thus the user may select a specific item using the touch-based pointer 1605.

FIG. 17 illustrates a Web page displayed on the display of the image display device.

Specifically, FIG. 17(*a*) illustrates a Web page 1710 with a search window 1720, displayed on the display. The user may enter a character into the search window 1720 by use of character keys (not shown) of a keypad displayed on a screen, character keys (not shown) of local keys, or character keys (not shown) of the remote controller.

FIG. 17(*b*) illustrates a search result page 1730 having search results matching a keyword entered into the search window, displayed on the display.

Since the image display devices according to the embodiments of the present disclosure are capable of fully browsing a Web page, the user can easily read the Web page.

FIG. 18 illustrates another Web page displayed on the display.

Specifically, FIG. 18(*a*) illustrates a mail service page 1810 including an ID input window 1820 and a password input window 1825, displayed on the display. The user may enter a specific numeral and/or text into the ID input window 1820 and the password input window 1825 using a keypad (not shown) displayed on the mail service page, character keys (not shown) of local keys, or character keys (not shown) of the remote controller. Hence, the user can log in to a mail service.

FIG. 18(*b*) illustrates a mail page displayed on the display, after a user logs in to the mail service. For example, the mail page may contains items "read mail", "write mail", "sent box", "received box", "recycle bin", etc. In the "received box" item, mail may be ordered by sender or by title.

The image display devices according to the embodiments of the present disclosure are capable of full browsing when displaying a mail service page.

Therefore, the user can conveniently use the mail service.

Although the network TV has been described exemplarily in FIG. 1 to FIG. 18 for convenience of description, the scope of the present disclosure is not limited to the network TV and can be applied to various multimedia devices (for example, mobile device, notebook computers, tablet, PC, DTV, and smart TV). Accordingly, a multimedia device adopted instead of the network TV will be used to describe the embodiments of the present disclosure with reference to FIG. 19 to FIG. 36.

Figure 19:
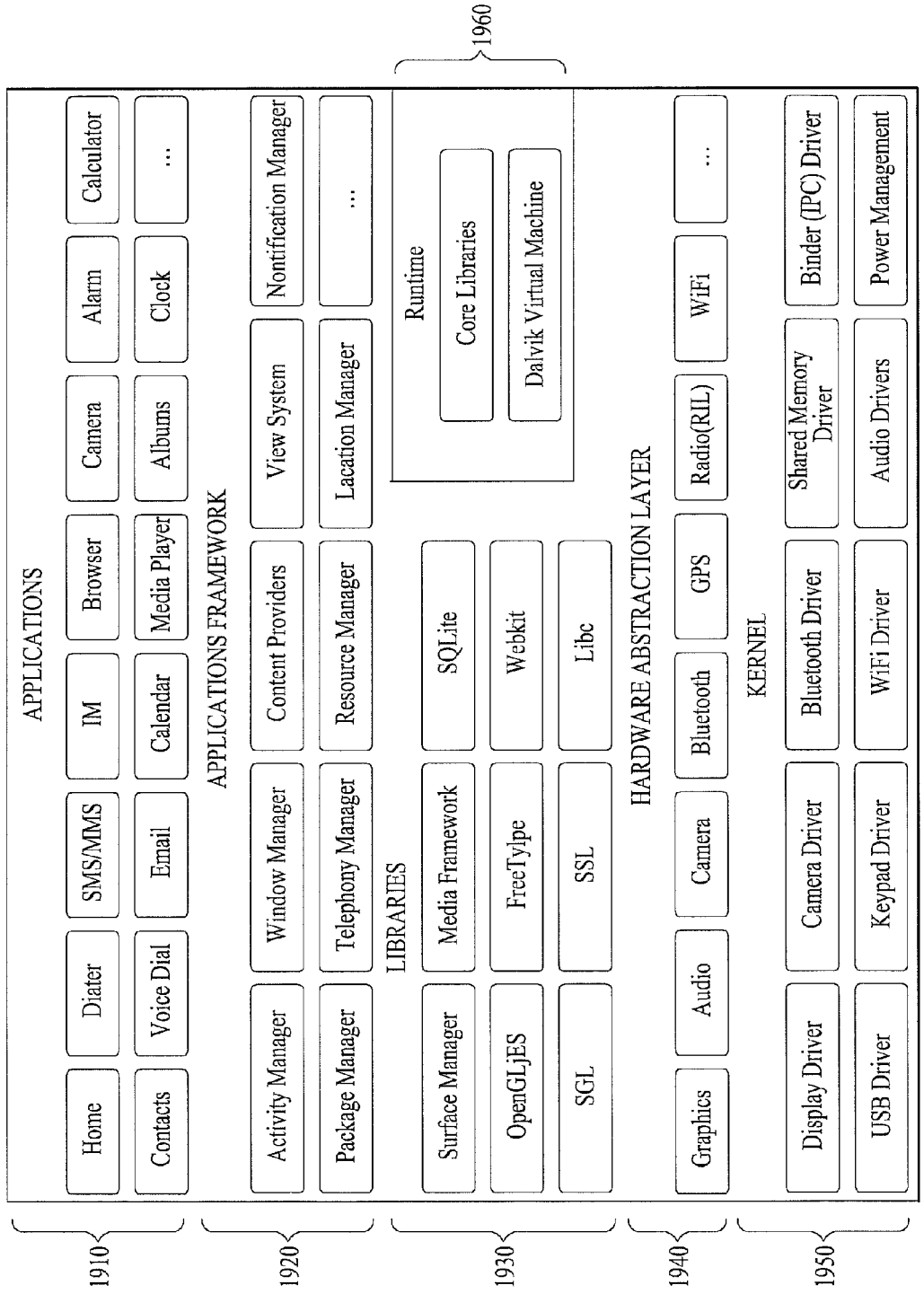
FIG. 19 is a diagram illustrating an OS architecture layer of a multimedia device according to one embodiment of the present disclosure.

FIG. 19 is a diagram illustrating an OS architecture layer of a multimedia device according to one embodiment of the present disclosure. Hereinafter, the OS architecture layer of the multimedia device according to one embodiment of the present disclosure will be described with reference to FIG. 19. However, the scope of the present disclosure is not limited to the layer illustrated in FIG. 19, and should basically be defined by claims.

As illustrated in FIG. 19, the OS architecture layer according to one embodiment of the present disclosure is divided into a total of five layers. In other words, the OS architecture layer includes an application layer 1910, an application framework 1920, a library layer 1930, a hardware abstraction layer (HAL) 1940, and a kernel layer 1950.

First of all, the highest layer corresponds to an application program region 1910, and a region located below the highest layer is the application framework 1920. The application framework 1920 includes processors that control Android through a daemon server type.

Also, an activity manager of the application framework 1920 takes the role of lifecycle of an application program. A package manager processes information of application programs which is operating in the system. The window manager takes the role of screen processing related to all application programs. A view system processes standard widget, and a first home screen may be designed as a widget.

The library region 1930 and the HAL 1940 mean a part that is developed as a native and can be connected with the application framework 1920. Also, a Dalvik virtual machine (VM) and a core library region 1960 are included in the library region 1930. Java applications that cannot control hardware are designed to perform communication with processors inside Android through a path called JNI.

In the mean time, the library region 1930 includes a surface manager, a media framework, SQLite, OpenGLjES, FreeType, WebKit, SGL, SSL, Libc, etc. Main elements of the library region 1930 will be described as follows.

The aforementioned Libc is an element implemented for an embedded environment, for example, and serves to support lightweight and quick pthread (POSIX Threads). Also, the aforementioned WebKit is based on an open source, WebKit Browser, and supports full browsing.

The aforementioned SQLite is an open source project, provides a lightweight DB solution, and is used by various services inside Android. Also, the aforementioned media framework is based on a PocketVideo OpenCore platform, and supports standard video, audio and still frame format. Moreover, the media framework supports H/W and S/W codec plug-in.

The aforementioned surface manager forwards surface rendering of all application programs to a frame buffer, whereby 2D and 3D can be displayed by various application programs at the same time, and forwards the buffer through Binder IPC call. The surface manager will be described later in more detail with reference to FIG. 26 and FIG. 27.

For example, the HAL region 1940 serves as a link where Android and hardware meet. For example, the HAL region 1940 includes an audio interface, a graphic interface, and WiFi. The HAL region 1940 further includes standardized APIs. The HAL region 1940 has an advantage in that it can add user-defined components optionally as the case may be.

A Linux kernel can be used as the kernel region 1950. In more detail, the kernel region 1950 includes a display, a driver, a camera driver, a Bluetooth driver, a shared memory driver, a binder driver, a USB driver, a keypad driver, a WiFi driver, an audio driver, and a power management. In particular, the binder driver and the power management will be described later in more detail with reference to FIG. 20 and FIG. 21.

As described above, the OS platform according to one embodiment of the present disclosure includes the kernel layer 1950, the HAL layer 1940, the library 1930, the application program framework 1920, and the application 1910.

Also, the application program framework 1920 is implemented in Java language, for example. A Java native interface (JNI) mapping different calling conventions between Java and C languages exists between the framework 1920 and the library 1930.

The library 1930 is a library built in an embedded applications binary interface (EABI), for example. Also, since the library 1930 includes a binder and is connected with a code C through JNI of Java, a size of C library, which is essentially used, can be reduced and efficiency can be improved.

Also, the surface manager located in the library region 1930 forwards surface rendering of all application programs to the frame buffer. Since the frame buffer is different from LCD in CPU speed, the same structure is provided in a DRAM or SRAM and all of memory blocks are copied, whereby the memory blocks are output to the LCD at one time. At this time, the memory space will be referred to as the frame buffer. Although the existing embedded Linux processes 2D and 3D, separately, this case processes 2D and 3D at the same time. Screen compositing, screen combining, and an aero glass effect can be processed at one time. Although a single buffer is enough for 2D, if it is applied to 3D, bottle neck phenomenon may be caused due to large data amount of 3D. For this reason, a double frame is used for 3D as the frame buffer. For example, the existing buffer size is increased as much as twice in case of 3D. If double buffering is applied to 2D, panorama pictures and background picture can be managed separately, whereby overhead can be reduced.

Also, in case of an application such as games, an application drafted in a specific computing language (for example, Java) should be used to display graphic data by using the application framework 1920. However, another application (for example, host dependent application related to time critical and maximum performance and not supported by Java) drafted in a native code not the specific computing language should be processed through a separate path, whereby graphic data can be displayed quickly. Accordingly, a new OS architecture for processing the application (in more detail, subtitle, caption, teletext, etc.) drafted in a native code will be described later in more detail with reference to FIG. 22 to FIG. 25.

Figure 20:
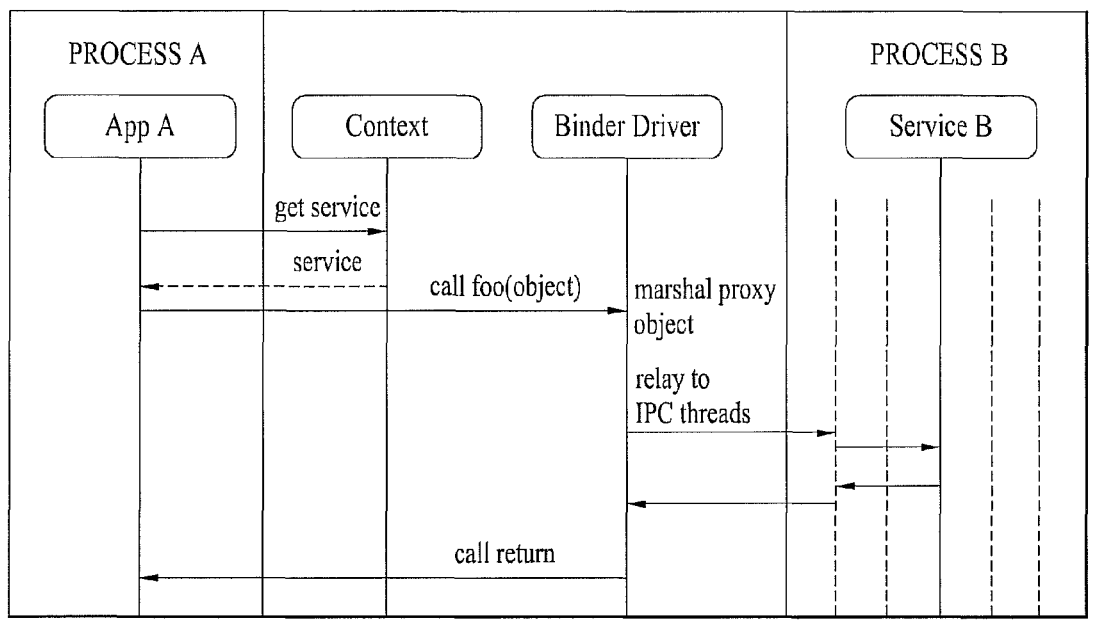
FIG. 20 is a detailed flow chart illustrating a call flow of a binder driver of a kernel layer illustrated in FIG. 19.

FIG. 20 is a detailed flow chart illustrating a call flow of a binder driver of a kernel layer illustrated in FIG. 19. Hereinafter, the call flow of the binder driver of the kernel layer illustrated in FIG. 19 will be described in more detail with reference to FIG. 20.

FIG. 20 illustrates a process of implementing a desired service B in a specific application A through a binder driver. The binder driver is used for program and data sharing. The binder does not have main hosting of the kernel and uses a service called bind. In other words, if bind is called, a bind service is attached to an application program and a device, whereby the application program and the device perform communication with each other. The bind service is not a kernel, and is operated when data are transmitted and received between different services or application programs.

Since the binder is operated separately, the possibility of hacking in communication is lowered, and security is improved. It is required to make the binder lightweight, if possible, to reduce waste of memory.

Also, the binder maintains ThreadPool. The binder is attached to both sides of each of the driver and the manager service. The binder is designed so as not to take time in binding, whereby resources are previously reserved for direct mapping. If application A and device driver B perform communication, a channel is generated. In this case, if another application C other than application A connected inside the channel, the binder should not be ended even though the application A has been ended.

Figure 21:
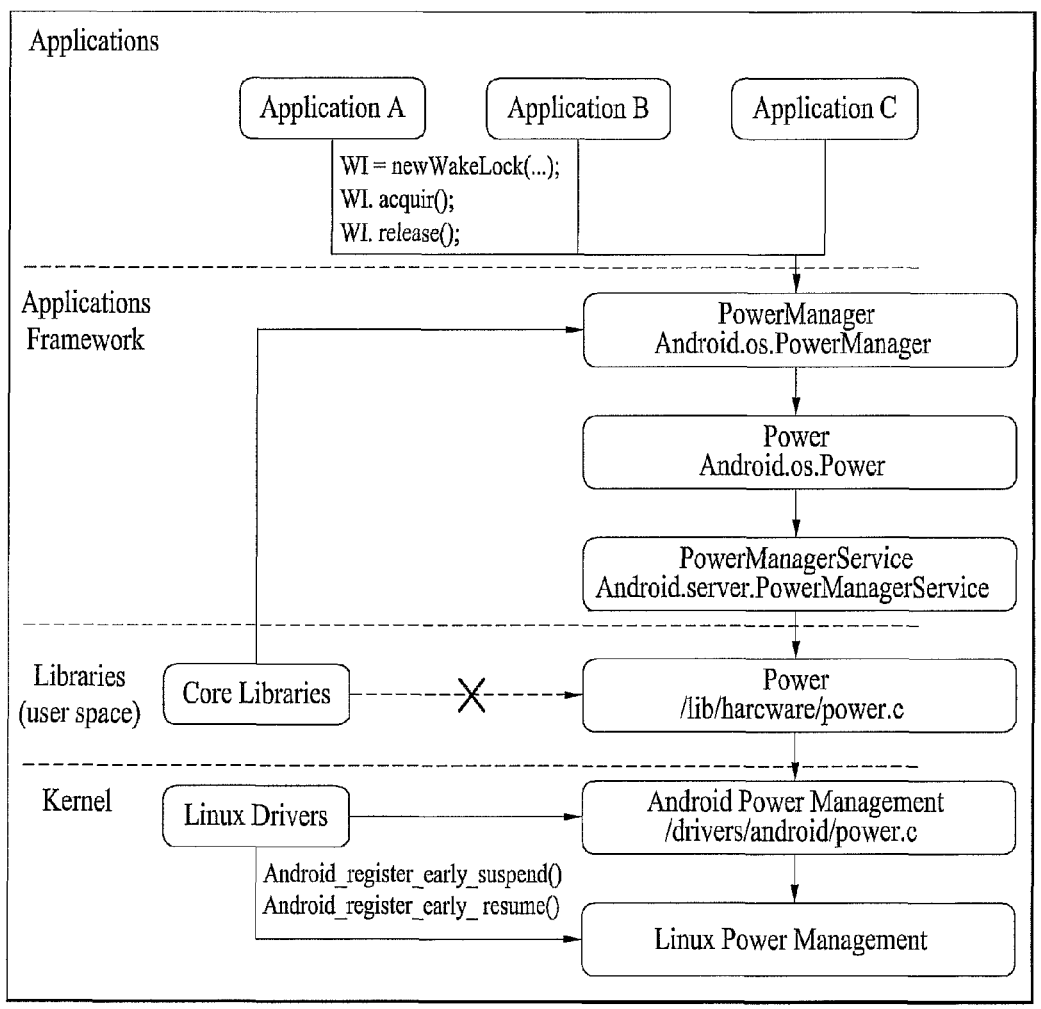
FIG. 21 is a detailed flow chart illustrating a call flow of a power management of a kernel layer illustrated in FIG. 19.

FIG. 21 is a detailed flow chart illustrating a call flow of a power management of a kernel layer illustrated in FIG. 19. The call flow of the power management of the kernel layer will be described in more detail with reference to FIG. 19.

As illustrated in FIG. 21, the OS according to one embodiment of the present disclosure does not end each application (application A, B, C, etc.) automatically. In other words, the OS is designed such that the applications are managed as one by the power management of the kernel region and a specific process is removed by a priority algorithm inside the operating system if memory is sufficient. A further explanation of FIGS. 19-21 can be found at http://5963581449325967972-a-1802744773732722657-s-sites.googlegroups.com/site/io/anatomy—physiology-of-an-android/Android-Anatomy-GoogleIO.pdf?attachauth=ANoY7crUJxDhdhQOS89sHm6Jc_XZ1p0SithzDOPbUPYRsgROsIXQEJWEyb0XakeGgWIp5Pzcf2kWcaY1V2sk4dfCIf5BCHgpkF_idJ0OAqlbos-IFCcwZtSpVWijM7s4uTOUnqHnJxnGZetNyzemP8CHb0pAdImwijaRxoSCUUisJo0vB3Zktlj0BrmnDjJIBGbhMPu7n-2gwffnq4tYgbyuAvhc TEGlkyT-FkrJy-&attredirects=0; http://www.youtube.com/watch?v=G-36noTCaiA&eurl=http%3A%2F%2Fsites.google.com%2Fsite%2Fio%2Fanatomy—physiology-of-an-android&feature=player_embedded; or http://sites.google.com/site/io/anatomy—physiology-of-an-android.

Figure 22:
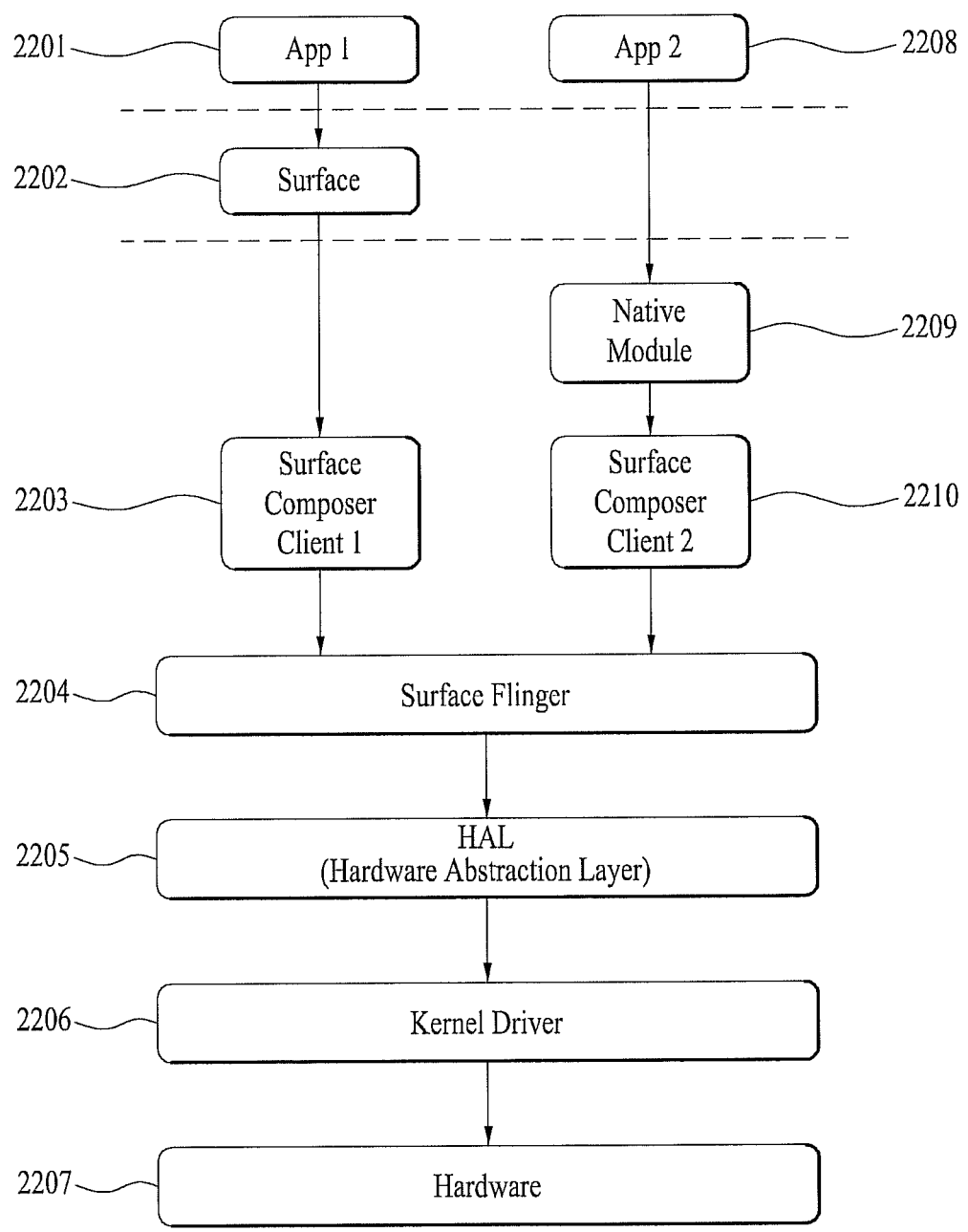
FIG. 22 is a detailed flow chart illustrating a layer for processing graphic data of an application drafted in a native code in a multimedia device according to one embodiment of the present disclosure.

FIG. 22 is a detailed flow chart illustrating a layer for processing graphic data of a managed application and graphic data of an application drafted in a native code in a multimedia device. For example, a managed application may correspond to an application drafted in a specific computing language (for example, Java language, C language, and C++ language), and the application drafted in a native code may correspond to an application drafted in a non-Java language. The multimedia device is designed to process the managed application and the application drafted in a native code through different paths as illustrated in FIG. 22.

In other words, a surface corresponding to graphic data of a managed application 2201 is processed through a first surface composer client 2203, a surface flinger 2204, HAL 2205, a kernel driver 2206, and hardware 2207. The may surface mean, e.g., an object that displays a memory block composited in a screen. The surface may retain one canvas object for display, for example, and provides various helper methods for changing a layer and a size of the surface.

An application (random application drafted in a native code) may correspond to external broadcast data or network data which is pre-processed by a native module 2209. The native module 2209 will be described later in detail with reference to FIG. 24 and FIG. 25.

The graphic data of the application, which are pre-processed by the native module, are displayed on the screen through a second composer client 2210, the surface flinger 2204, the HAL 2205, the kernel driver 2206, and the hardware 2207.

As illustrated in FIG. 22, the multimedia device provided with an operating system (OS) capable of processing a plurality of graphic data includes a first client (corresponding to 2203 of FIG. 22) receiving first graphic data of the managed application, a native module (2209 of FIG. 22) pre-processing the application drafted in a native code, and a second client (2210 of FIG. 22) receiving second graphic data of the application drafted in a native code pre-processed by the native module. Moreover, the multimedia device further includes a composite module (2204 of FIG. 22) compositing the first graphic data output from the first client (corresponding to 2203 of FIG. 22) and the second graphic data output from the second client (2210 of FIG. 22), and a display module (corresponding to 2207 of FIG. 22) outputting the composited first and second graphic data.

The composite module is designed such that it is accessed to the first client and the second client to perform data communication. Accordingly, even though broadcast data or network data are not drafted in Java language, the broadcast data or network data can be composited with graphic data of an application drafted in Java language without being redrafted in Java language.

Figure 23:
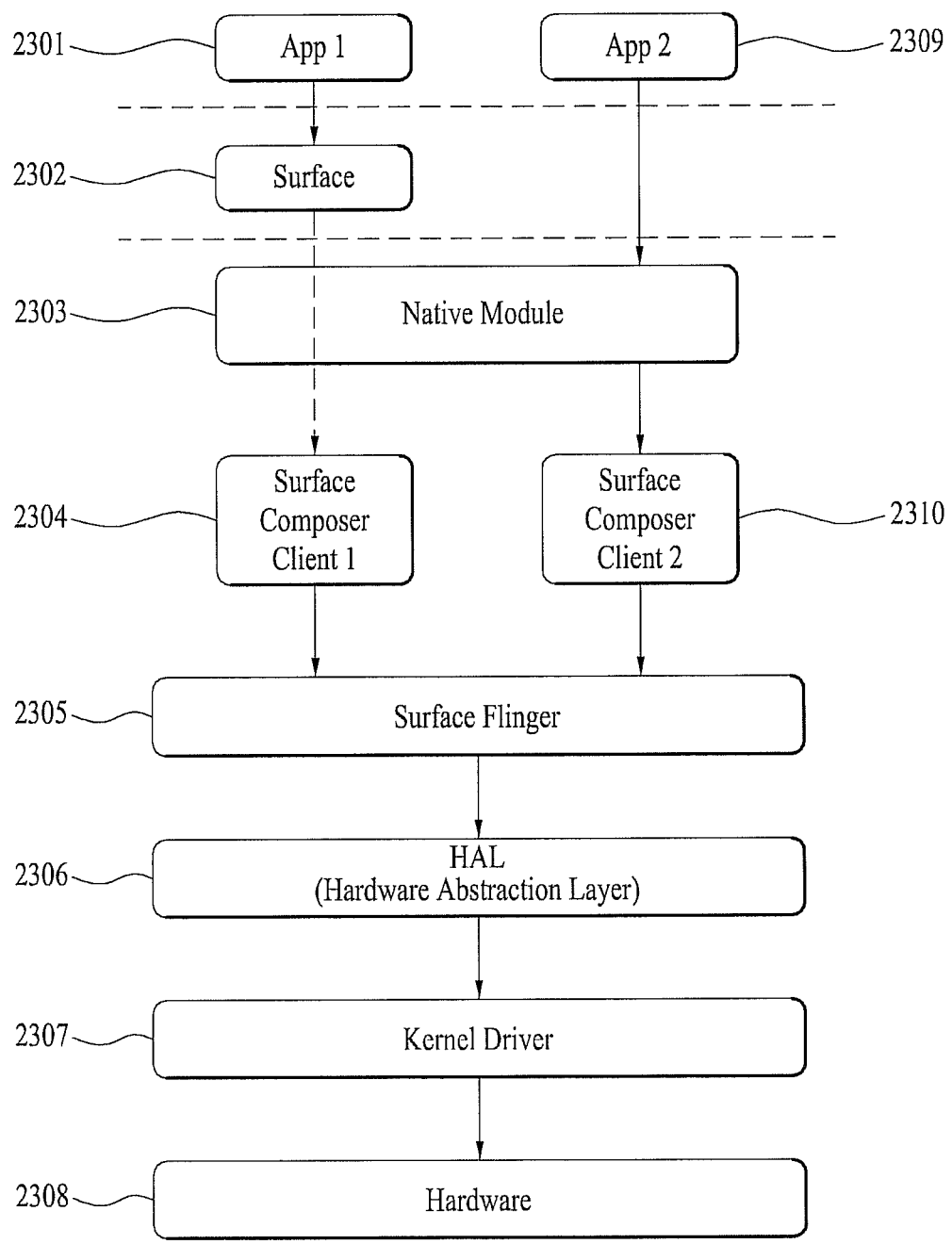
FIG. 23 is a detailed flow chart illustrating a layer for processing graphic data of an application drafted in a native code in a multimedia device according to another embodiment of the present disclosure.

FIG. 23 is a detailed flow chart illustrating a layer for processing graphic data of an application drafted in a native code in a multimedia device according to another embodiment of the present disclosure. As compared with the embodiment of FIG. 22, the embodiment of FIG. 23 is designed such that a managed application may bypass a native module.

A surface corresponding to graphic data of a managed application 2301 may be designed to bypass a native module 2303. The surface 2302 corresponding to graphic data of the managed application is processed through a first surface composer client 2304, a surface flinger 2305, HAL 2306, a kernel driver 2307, and hardware 2308. An application (random application drafted in a native code) corresponding to external broadcast data or network data may be pre-processed by the native module 2303. The native module 2303 will be described later in detail with reference to FIG. 24 and FIG. 25.

The graphic data of the application, which are pre-processed by the native module, are displayed on the screen through a second composer client 2310, the surface flinger 2305, the HAL 2306, the kernel driver 2307, and the hardware 2308.

Figure 24:
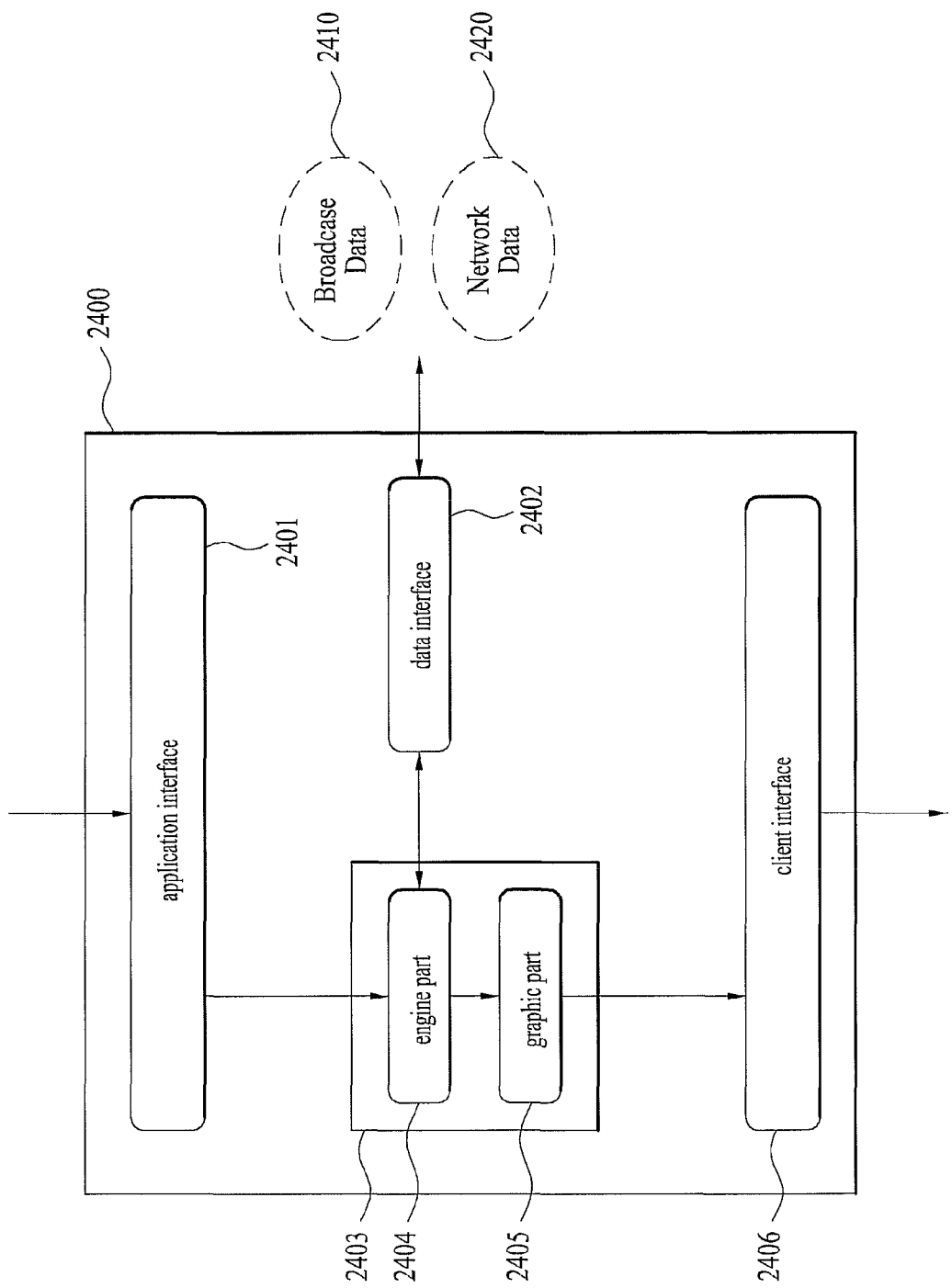
FIG. 24 is a detailed block diagram illustrating a native module illustrated in FIG. 22 or FIG. 23.

FIG. 24 is a detailed block diagram illustrating a native module illustrated in FIG. 22 or FIG. 23. A native module 2400 according to one embodiment of the present disclosure may include an application interface 2401, a data interface 2402, a graphic module 2403, and a client interface 2406. The graphic module 2403 includes an engine part 2404 and a graphic part 2405.

The application interface 2401 may be controlled by the managed application, for example, and may control start and end of the native module 2400. The data interface 2402 may receive applications 2410 and 2420 drafted in a native code through broadcasting or network.

The graphic module 2403 may process the graphic data of the application received from the data interface 2402, into second graphic data that can be output. The engine part 2404 parses the data forwarded from the data interface 2402, and the graphic part 2405 processes graphic data to be output.

The client interface 2406 may serve to forward the processed second graphic data to the second surface composer client illustrated in FIG. 22 or FIG. 23. As described above, the second surface composer client may be referred to as a second client.

Figure 25:
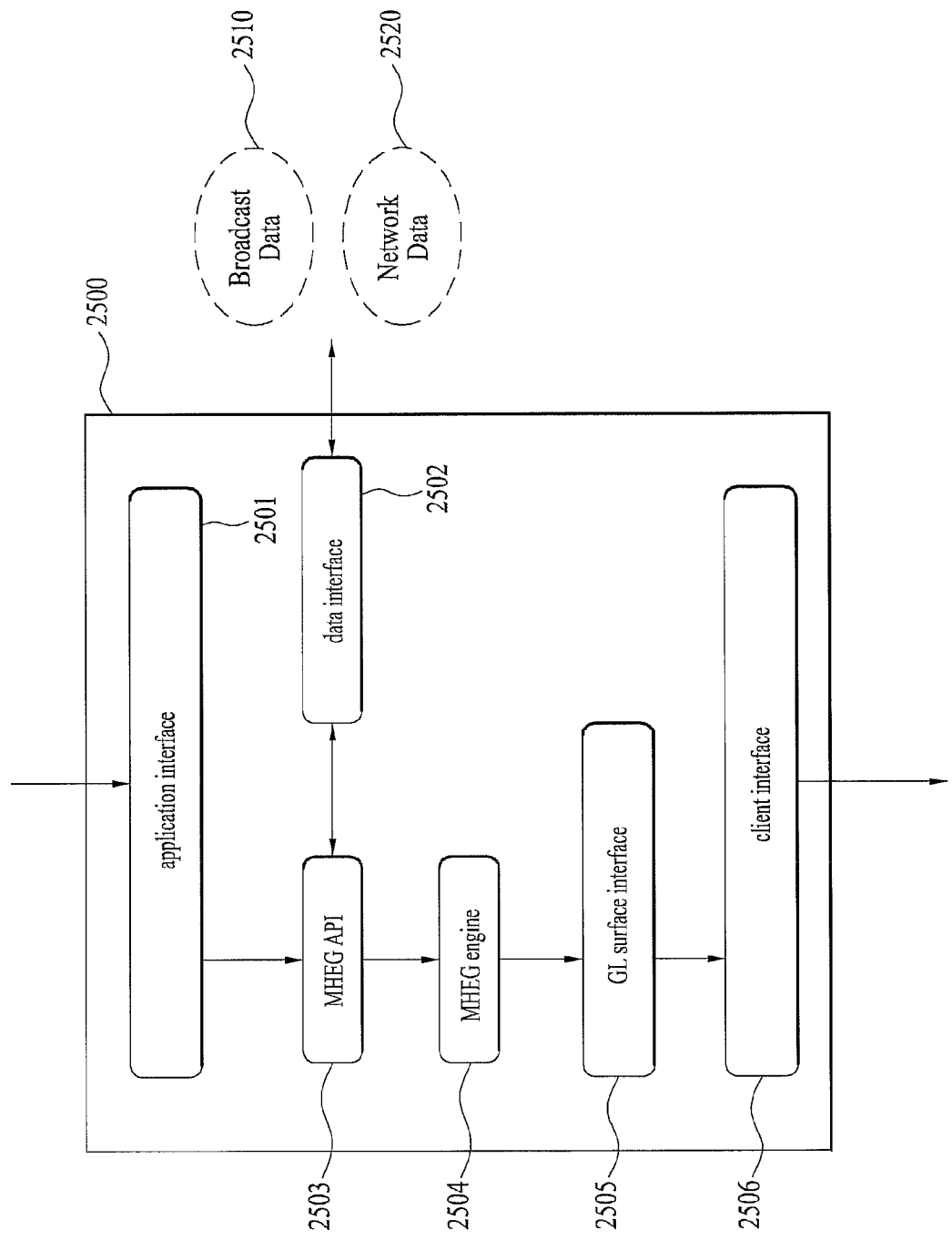
FIG. 25 is another detailed block diagram illustrating a native module illustrated in FIG. 22 or FIG. 23.

FIG. 25 is another detailed block diagram illustrating a native module illustrated in FIG. 22 or FIG. 23. As compared with FIG. 24, FIG. 25 illustrates that a Multimedia and Hypermedia information coding Experts Group (MHEG) application may be processed.

A native module 2500 according to another embodiment of the present disclosure may include an application interface 2501, a data interface 2502, an MHEG API 2503, an MHEG engine 2504, a GL surface interface 2505, and a client interface 2506.

The application interface 2501 may be controlled, e.g., by the managed application, and control start and end of the native module 2500. The data interface 2502 may receive MHEG applications 2510 and 2520 drafted in a native code through broadcasting or network.

The MHEG API 2503 may process MHEG On/Off and remote key control, and the MHEG engine 2504 may parse MHEG App data by receiving section data through broadcasting or network. The GL surface interface 2505 may receive data to be displayed from the engine 2504 and then may forward the received data to the client interface 2506. The client interface may be referred to as a surface interface.

Alternatively, the MHEG API 2503 illustrated in FIG. 25 may be replaced with a caption API and the MHEG engine 2504 may be replaced with a caption engine. If the MHEG API and the MHEG engine are designed as above, it may be advantageous in that a native application provided by another broadcast environment can be processed simultaneously with the managed application.

Figure 26:
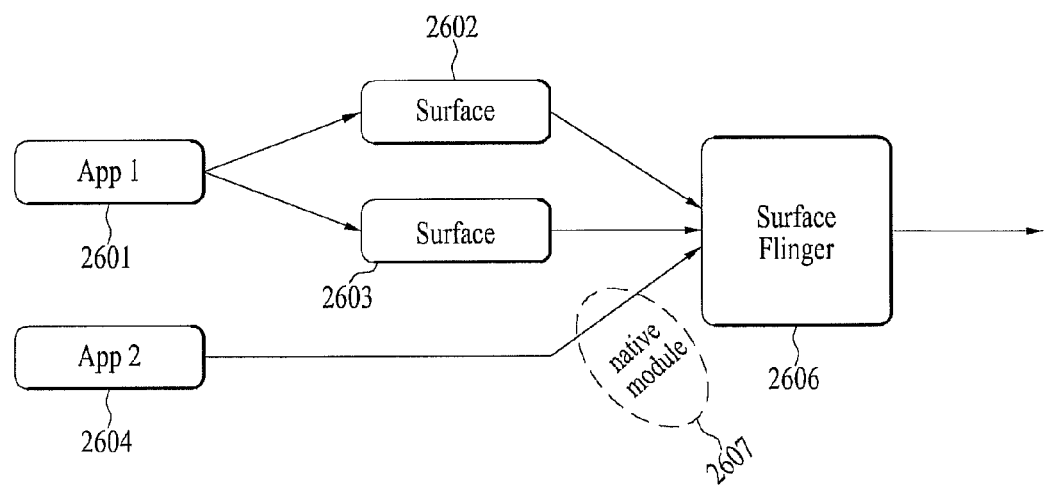
FIG. 26 is a diagram illustrating a process of processing a plurality of graphic data in a multimedia device according to one embodiment of the present disclosure.

FIG. 26 is a diagram illustrating a process of processing a plurality of graphic data in a multimedia device according to one embodiment of the present disclosure.

Surfaces 2602 and 2603 constituting graphic data of a managed application 2601 are directly forwarded to a surface flinger 2606. On the other hand, a surface 2605 constituting graphic data of an application 2604, which is drafted in a native code, not the managed application, is pre-processed by the native module 2607 described above and then forwarded to the surface flinger 2606. The surface flinger 2606 collects various surface data to update a frame buffer, thereby outputting composited graphic data. This will be described in more detail with reference to FIG. 27.

Figure 27:
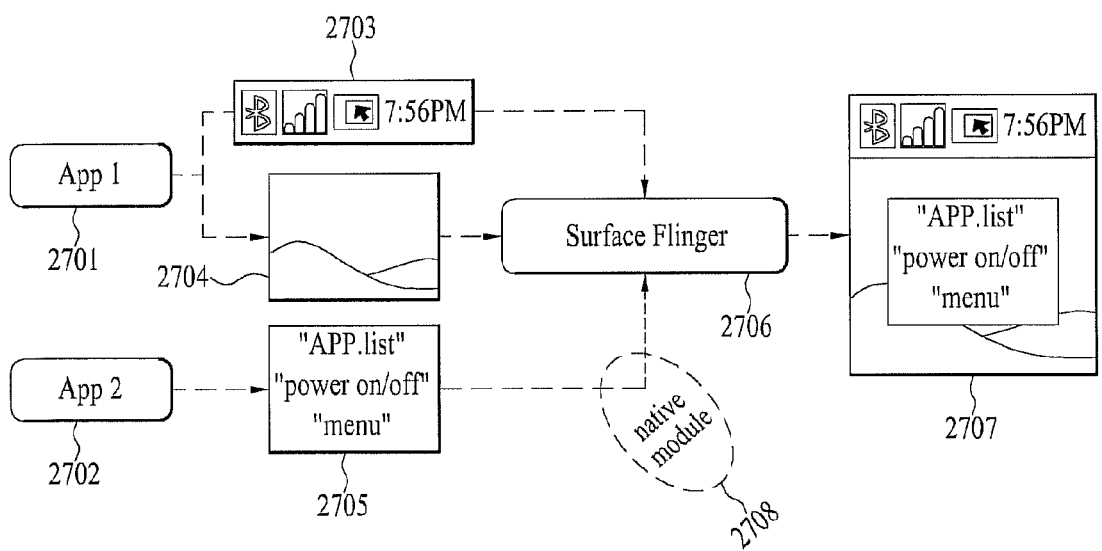
FIG. 27 is a detailed diagram illustrating a process illustrated in FIG. 26.

FIG. 27 is a detailed diagram illustrating a process illustrated in FIG. 26. Surfaces 2703 and 2704 constituting graphic data of a managed application 2701 are directly forwarded to a surface flinger 2706. As illustrated in FIG. 27, the surfaces 2703 and 2704 constituting graphic data of the managed application 2701 may be home menu screens or time screens, which are previously stored.

On the other hand, a surface 2705 constituting graphic data of an application 2702, which is drafted in a native code, not a managed application, is pre-processed by the native module 2708 described above and then forwarded to the surface flinger 2706. As illustrated in FIG. 27, the surface 2705 constituting graphic data of the application 2702 drafted in a native code language may correspond to teletext data received through broadcasting or network. The surface flinger 2706 collects the aforementioned surface data to output a finally composited screen 2707.

Figure 28:
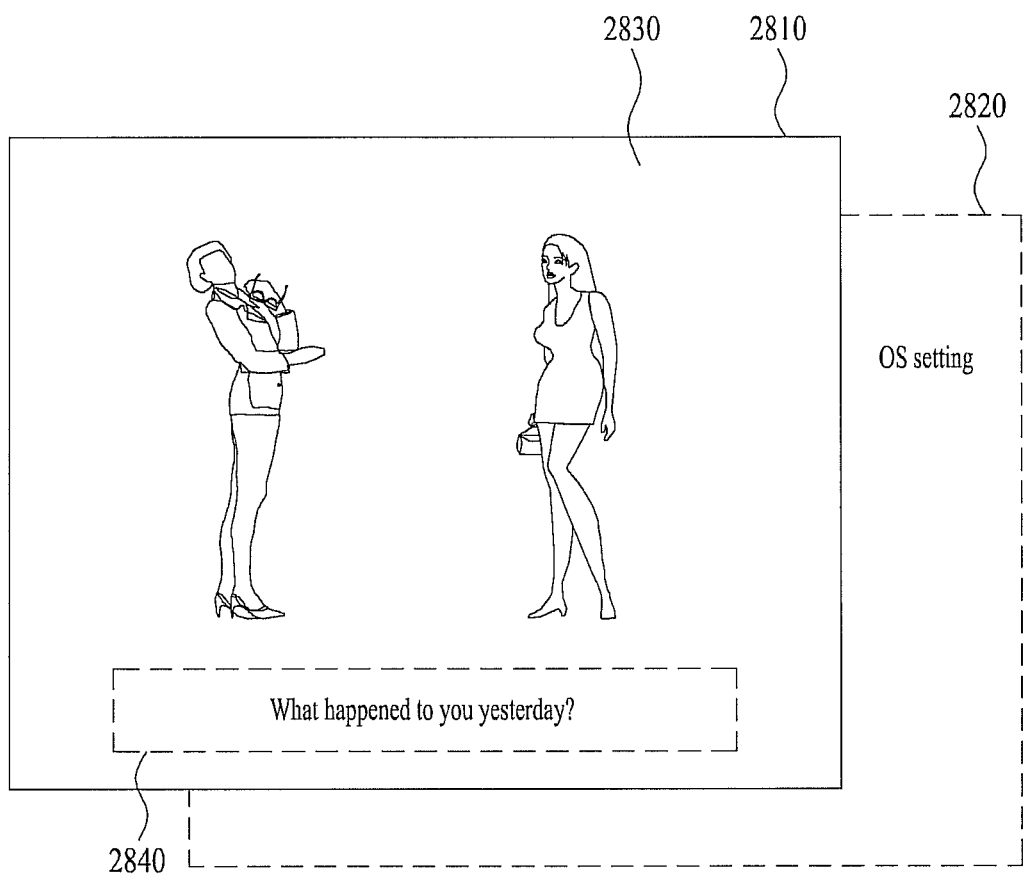
FIG. 28 is a diagram illustrating an example of a screen for outputting a plurality of graphic data, which are processed through different paths, in a multimedia device according to one embodiment of the present disclosure.

FIG. 28 is a diagram illustrating an example of a screen for outputting a plurality of graphic data, which are processed through different paths, in a multimedia device according to another embodiment of the present disclosure. A multimedia device 2810 according to one embodiment of the present disclosure is provided with an operating system (OS) 2820 described above. In this case, the multimedia device 2810 displays first graphic data corresponding to a managed application in a first region 2830 inside a screen, and displays second graphic data corresponding to an application drafted in a native code language in a second region 2840 inside the screen. Also, in FIG. 28, it is assumed that the managed application corresponds to a movie application 2830 and the application drafted in a native code corresponds to a caption application 2840.

Figure 29:
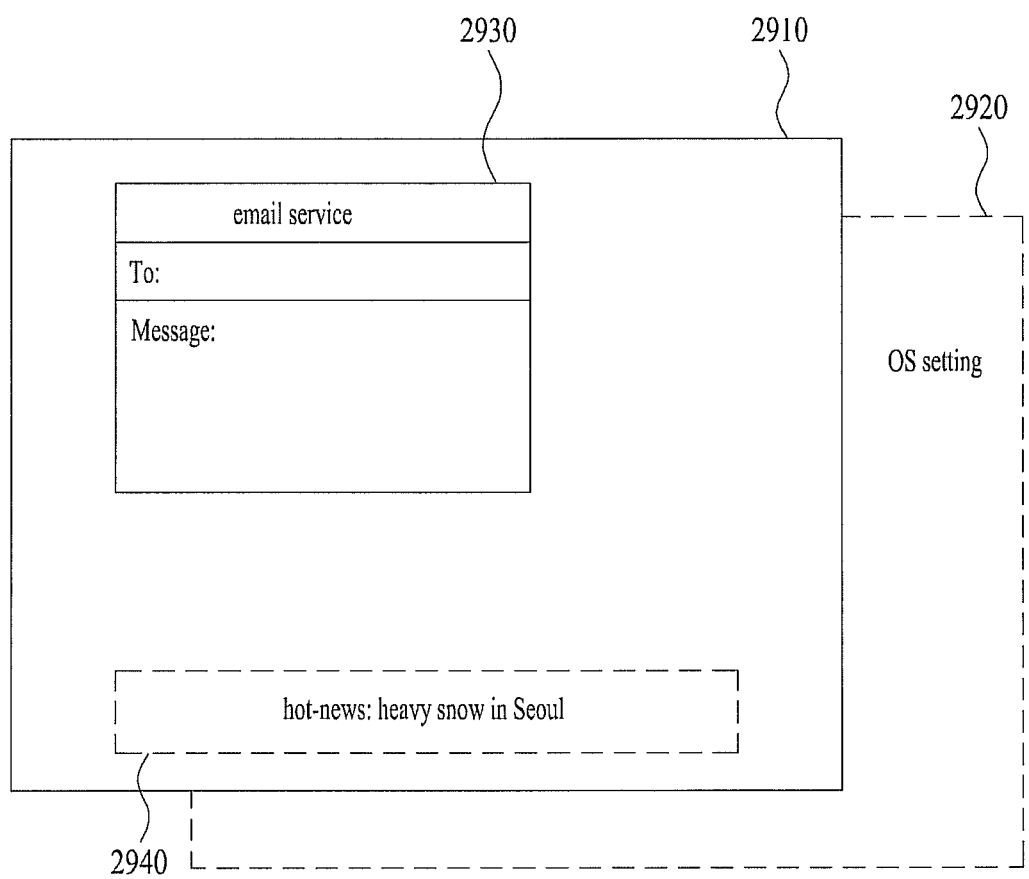
FIG. 29 is a diagram illustrating another example of a screen for outputting a plurality of graphic data, which are processed through different paths, in a multimedia device according to one embodiment of the present disclosure.

FIG. 29 is a diagram illustrating another example of a screen for outputting a plurality of graphic data, which are processed through different paths, in a multimedia device according to another embodiment of the present disclosure. A multimedia device 2910 according to one embodiment of the present disclosure is provided with an OS 2920 described above. The multimedia device 2910 displays first graphic data corresponding to a managed application in a first region 2930 inside a screen, and displays second graphic data corresponding to an application drafted in a native code in a second region 2940 inside the screen. In FIG. 29, it is assumed that the managed application corresponds to an email application 2930 and the application drafted in a native code corresponds to a teletext application 2940.

In the mean time, it is to be understood that the application drafted in a native code is not limited to the example of FIG. 28 or FIG. 29. For example, the application drafted in a native code may correspond to an application related to at least one or more of teletext, subtitle or caption.

Moreover, there is no limitation in the OS 2820, 2920 illustrated in FIG. 28 and FIG. 29. The Android OS based layer may be designed through modifications illustrated in FIG. 22 to FIG. 25.

Figure 30:
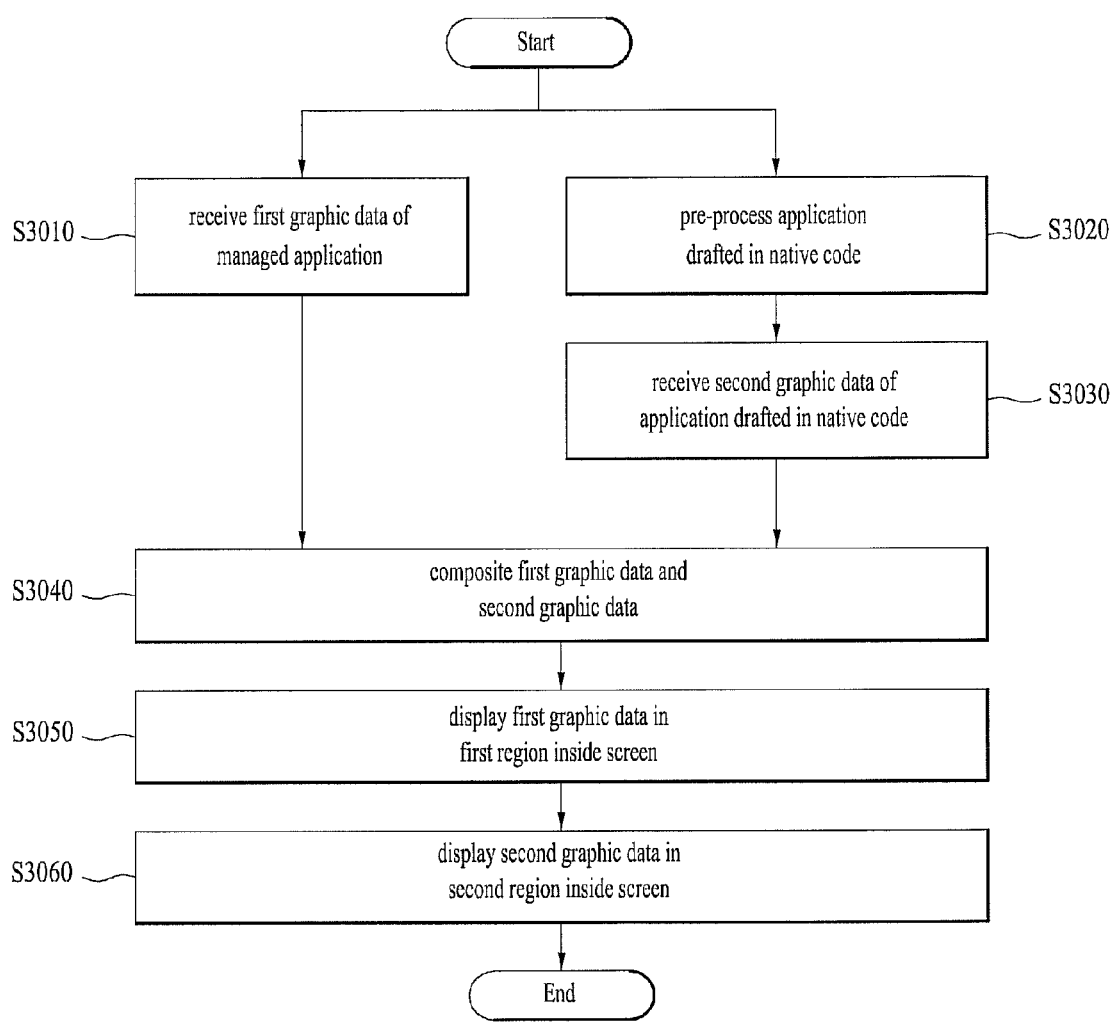
FIG. 30 is a flow chart illustrating a process of processing a plurality of graphic data at the same time in a multimedia device according to another embodiment of the present disclosure.

FIG. 30 is a flow chart illustrating a process of processing a plurality of graphic data at the same time in a multimedia device according to another embodiment of the present disclosure. The process of processing a plurality of graphic data at the same time in a multimedia device according to another embodiment of the present disclosure will be described with reference to FIG. 30.

A multimedia device provided with an OS capable of processing a plurality of graphic data receives first graphic data of a managed application from a first client (S3010). In the mean time, the multimedia device pre-processes an application drafted in a native code (S3020), and receives second graphic data of the pre-processed application drafted in a native code from a second client (S3030). The step S3020 will be described later in more detail with reference to FIG. 31.

The multimedia device is designed to composite the first graphic data output from the first client and the second graphic data output from the second client (S3040).

The multimedia device displays the first graphic data of the composited data in a first region 2930 inside a screen (S3050), and displays the second graphic data of the composited data in a second region inside the screen (S3060). The multimedia device may be designed such that the steps S3050 and S3060 may be performed in due order or at the same time.

Figure 31:
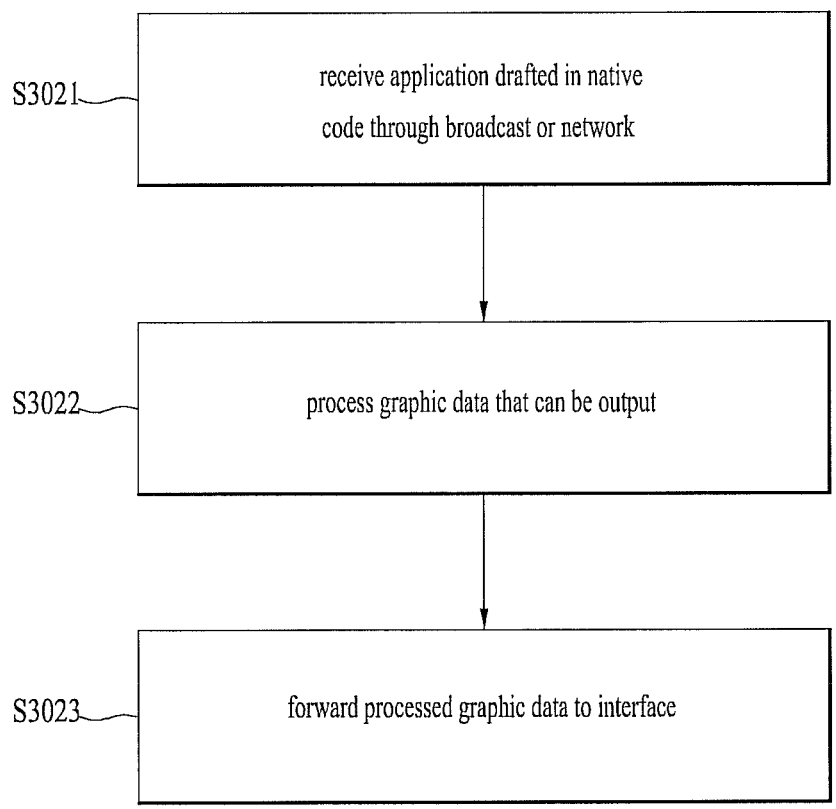
FIG. 31 is a detailed flow chart illustrating a step S3020 illustrated in FIG. 30.

FIG. 31 is a detailed flow chart illustrating a step S3020 illustrated in FIG. 30. The pre-processing step S3020 illustrated in FIG. 30 includes a step S3021 of receiving the application drafted in a native code through broadcasting or network, a step S3022 of processing the graphic data of the received application to second graphic data that can be output, and a step S3023 of forwarding the processed second graphic data to the second client.

According to the aforementioned embodiments, graphic data of the application that requires time critical, maximum performance, etc. can be displayed through the native module, the surface composer client, etc.

Also, according to the aforementioned embodiments, as the native module is defined in detail, it is advantageous in that porting scalability and easiness of the application drafted in the existing native code can be improved.

Moreover, according to the aforementioned embodiments, the graphic data of the applications not drafted in a specific computing language (for example, Java language) can be processed without redrafting in the specific computing language.

Figure 32:
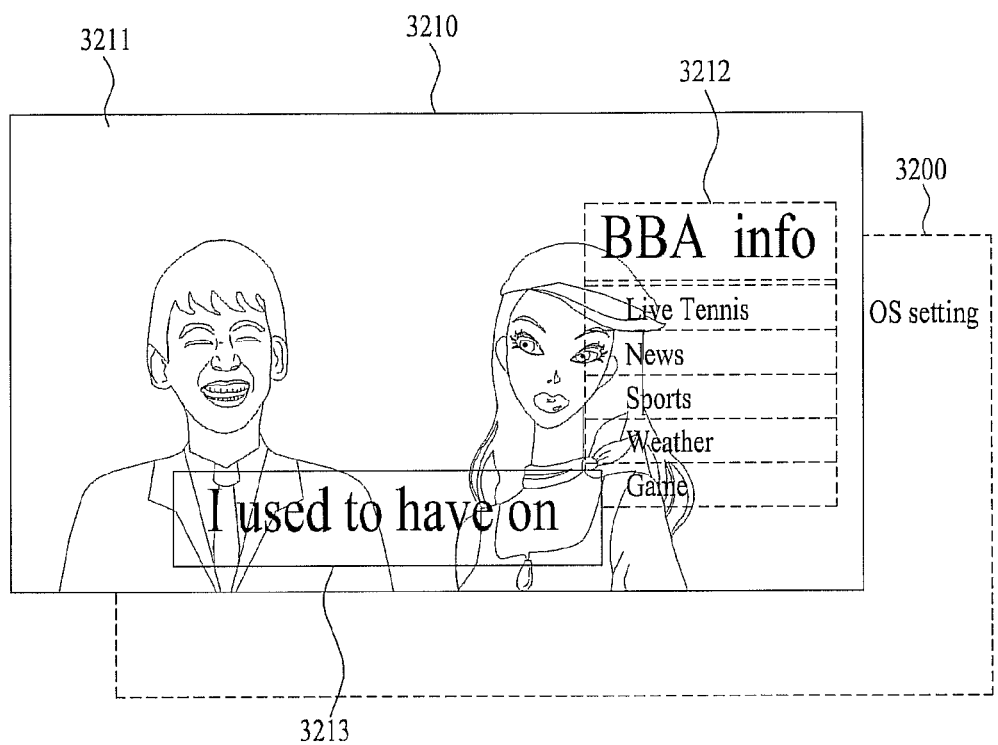
FIG. 32 is a diagram illustrating an example of a screen for outputting a plurality of graphic data, which are processed through different paths, at an overlaid state in a multimedia device according to one embodiment of the present disclosure.

FIG. 32 is a diagram illustrating an example of a screen for outputting a plurality of graphic data, which are processed through different paths, at an overlaid state in a multimedia device according to one embodiment of the present disclosure. FIG. 32 may be interpreted with reference to the aforementioned description of FIG. 30 and FIG. 31.

As illustrated in FIG. 32, a multimedia device 3210 according to one embodiment of the present disclosure is provided with an OS 3300 described above.

First of all, it is assumed that the multimedia device 3210 outputs a normal broadcast screen 3211. The normal broadcast screen 3211 may be replaced with a home screen or an AV output screen from an external device.

If a command that executes a first application using a user interface of the multimedia device 3210 is received, first graphic data 3210 corresponding to the first application are displayed.

If a command that executes a second application using the user interface of the multimedia device 3210 is received, second graphic data 3213 corresponding to the second application are displayed. At this time, as illustrated in FIG. 32, the first graphic data 3212 of a managed application and the second graphic data 3213 based on an application drafted in native code are overlaid. As described above, since an OS 3200 according to one embodiment of the present disclosure is designed to pre-process the application drafted in a native code, graphic data corresponding to a plurality of different kinds of applications can be overlaid.

Moreover, although the screen where graphic data of the application that has received a command most recently based on time are displayed most definitely or in the uppermost layer is illustrated in FIG. 32, the scope of the present disclosure is not limited to the example of FIG. 32.

Figure 33:
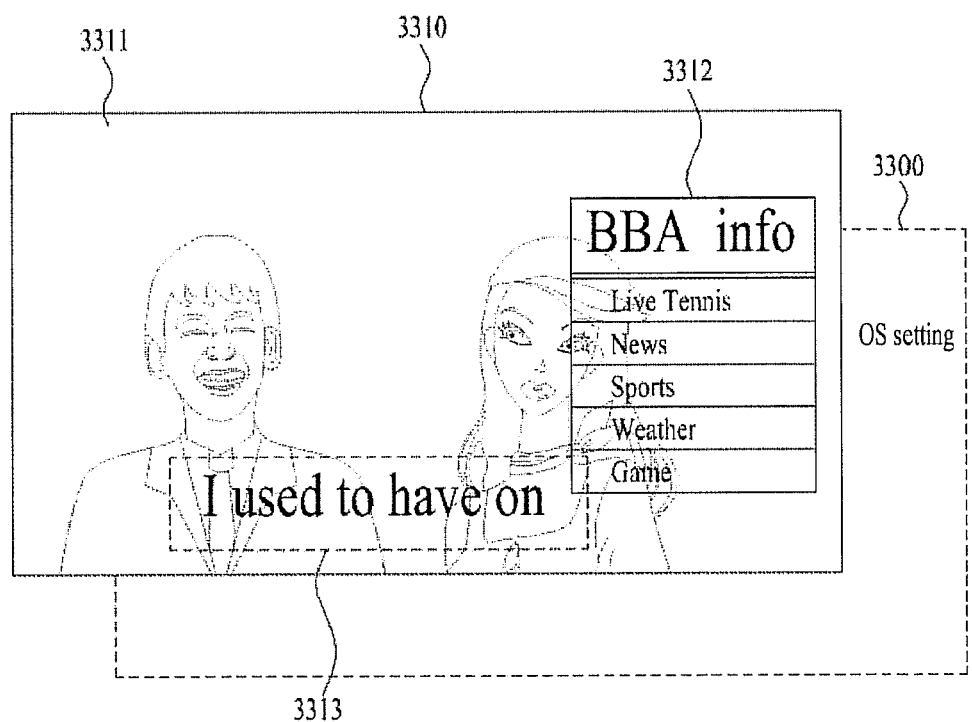
FIG. 33 is a diagram illustrating another example of a screen for outputting a plurality of graphic data, which are processed through different paths, at an overlaid state in a multimedia device according to one embodiment of the present disclosure.

FIG. 33 is a diagram illustrating another example of a screen for outputting a plurality of graphic data, which are processed through different paths, at an overlaid state in a multimedia device according to one embodiment of the present disclosure. FIG. 33 may be interpreted with reference to the aforementioned description of FIG. 30 and FIG. 31.

As illustrated in FIG. 33, a multimedia device 3310 according to another embodiment of the present disclosure is provided with an OS 3300 described above. The OS 3300 can be understood with reference to FIG. 22 to FIG. 25. Also, a main screen 3311 illustrated in FIG. 33 corresponds, e.g., to a normal broadcast screen.

The graphic data of the applications are overlaid based on time reference of each command in FIG. 32, whereas the graphic data are overlaid, in FIG. 33, in accordance with a priority previously set by a user or a priority set as default, regardless of the time reference.

For example, it is assumed that the user sets an application related to channel additional information to have a priority over a caption application (of course, automatic setting of the priority regardless of user setting pertains to the scope of the present disclosure). Accordingly, after a command to execute a managed application related to channel additional information is received, even though a command to execute the caption application is received, data are displayed in such a manner that first graphic data 3312 corresponding to the managed application related to channel additional information having the priority is overlaid on second graphic data 3313 corresponding to the caption application drafted in a native language.

According to the related art, a problem occurs in that two different applications (if one is a managed application, the other one is an application drafted in a native code) cannot be output in an overlaid type. However, according to the embodiments of the present disclosure, the problem of the related art can be solved. Moreover, as illustrated in FIG. 22 to FIG. 25, since a module for pre-processing native applications is designed as one chip, it is advantageous in that a plurality of chips are not required to process each application.

Figure 34:
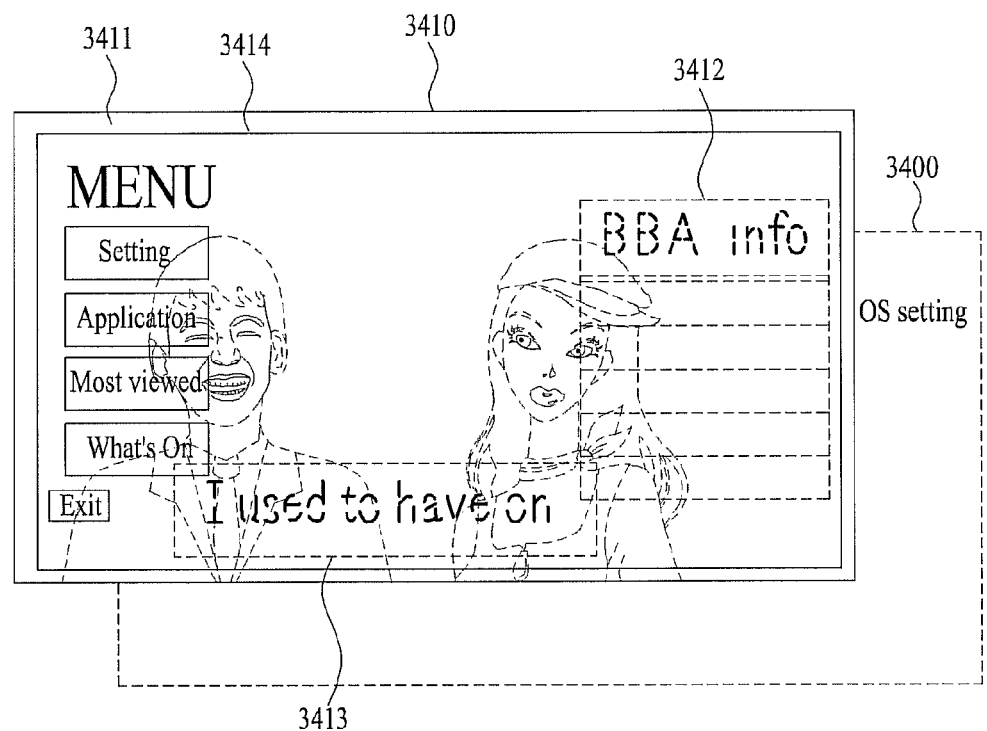
FIG. 34 is a diagram illustrating other example of a screen for outputting a plurality of graphic data, which are processed through different paths, at an overlaid state in a multimedia device according to one embodiment of the present disclosure.

FIG. 34 is a diagram illustrating other example of a screen for outputting a plurality of graphic data, which are processed through different paths, at an overlaid state in a multimedia device according to another embodiment of the present disclosure. FIG. 34 may be interpreted with reference to the aforementioned description of FIG. 30 and FIG. 31.

As illustrated in FIG. 34, a multimedia device 3410 according to another embodiment of the present disclosure is provided with an OS 3400 described above. The OS 3400 can be understood with reference to FIG. 22 to FIG. 25. A main screen 3411 illustrated in FIG. 34 corresponds to a normal broadcast screen, for example. Moreover, unlike FIG. 32 and FIG. 33, it is assumed in FIG. 34 that graphic data of three applications are processed at the same time.

In more detail, it is assumed that the multimedia device 3410 sequentially receives commands for executing a first application and a second application while outputting a normal broadcast screen. Also, if a command to execute a third application (for example, main menu) is received, as illustrated in FIG. 34, first graphic data 3412 corresponding to the first application and second graphic data 3413 corresponding to the second application are designed to have relatively lower definition than that of third graphic data 3413.

At this time, the first graphic data 3412 and the second graphic data 3413 are changed to an inactive state that cannot be selected by the user, and the third graphic data is maintained in an active state that can be selected by the user. As described above, the third application corresponding to the third graphic data 3414 has the highest priority or corresponds to the application selected most recently by the user. In this example, first graphic data 3412 may be from a managed application and the second graphic data 3413 may be from an application written in native code. The third graphic data 3414 may be from a managed application or an application written in native code.

According to the related art, a problem occurs in that graphic data corresponding to different applications can be neither overlaid at the same time nor processed more quickly.

Figure 35:
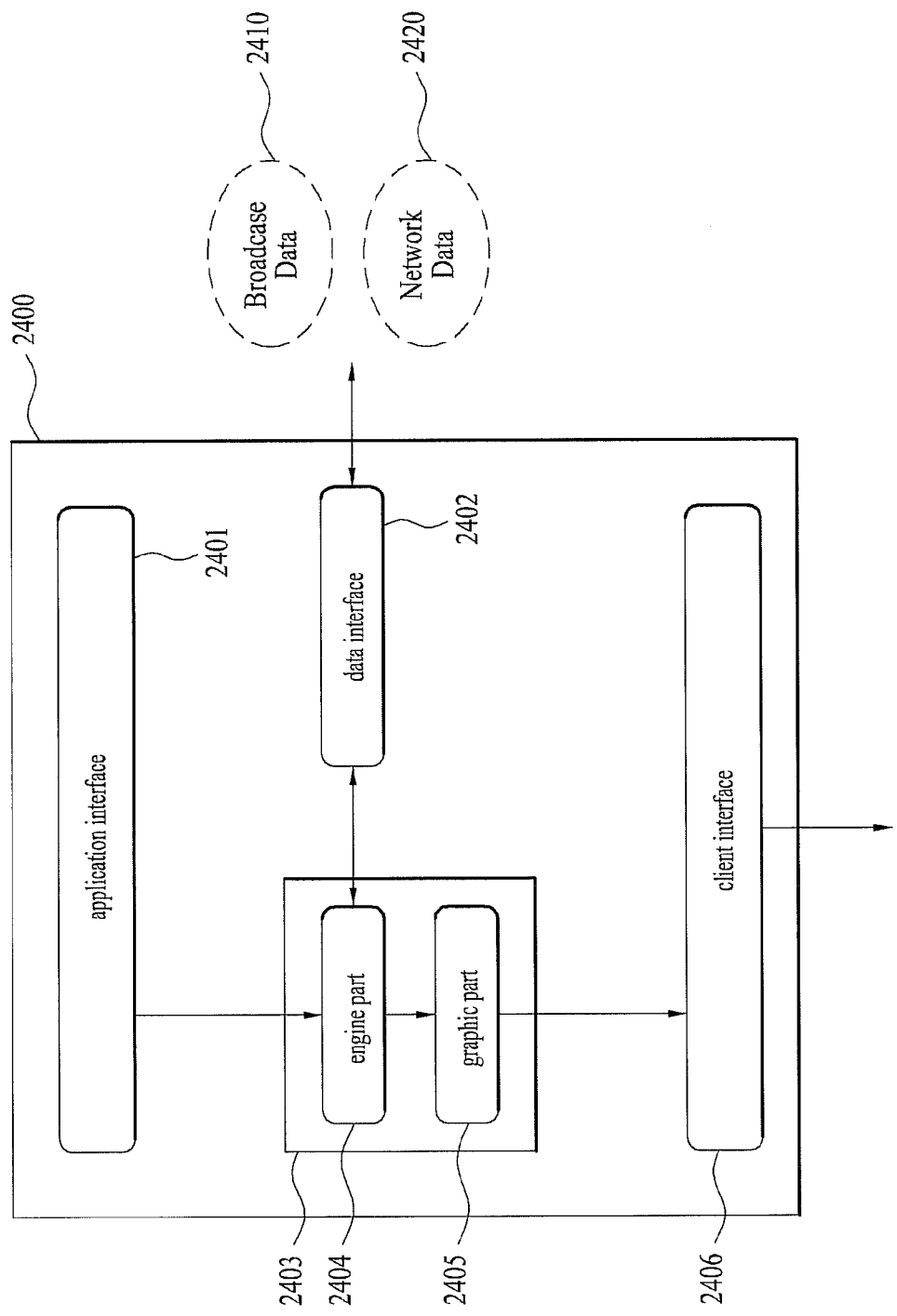
FIG. 35 is a diagram illustrating an example that a multimedia device illustrated in FIG. 24 is applied to a 3D TV.

FIG. 35 is a diagram illustrating an example that a multimedia device illustrated in FIG. 24 is applied to a 3D TV. If one embodiment of the present disclosure is applied to a 3DTV, the native module inside the multimedia device illustrated in FIG. 24 is designed as illustrated in FIG. 35. As compared with FIG. 24, a 3D data processing part 3510 is additionally provided in FIG. 35. Accordingly, the description of the other modules can be understood with reference to FIG. 24.

In order to configure a 3D screen having two or more regions, a position of a layer corresponding to each region should be designated. For example, it is required that a layer position of the first application (caption application) and a layer position of the second application (application related to channel additional information) should be designated.

Accordingly, before graphic data of an application drafted in a native code are forwarded to the client interface 2406, the 3D data processing part illustrated in FIG. 35 temporarily sets a layer where the graphic data of the application drafted in a native code should be located.

Figure 36:
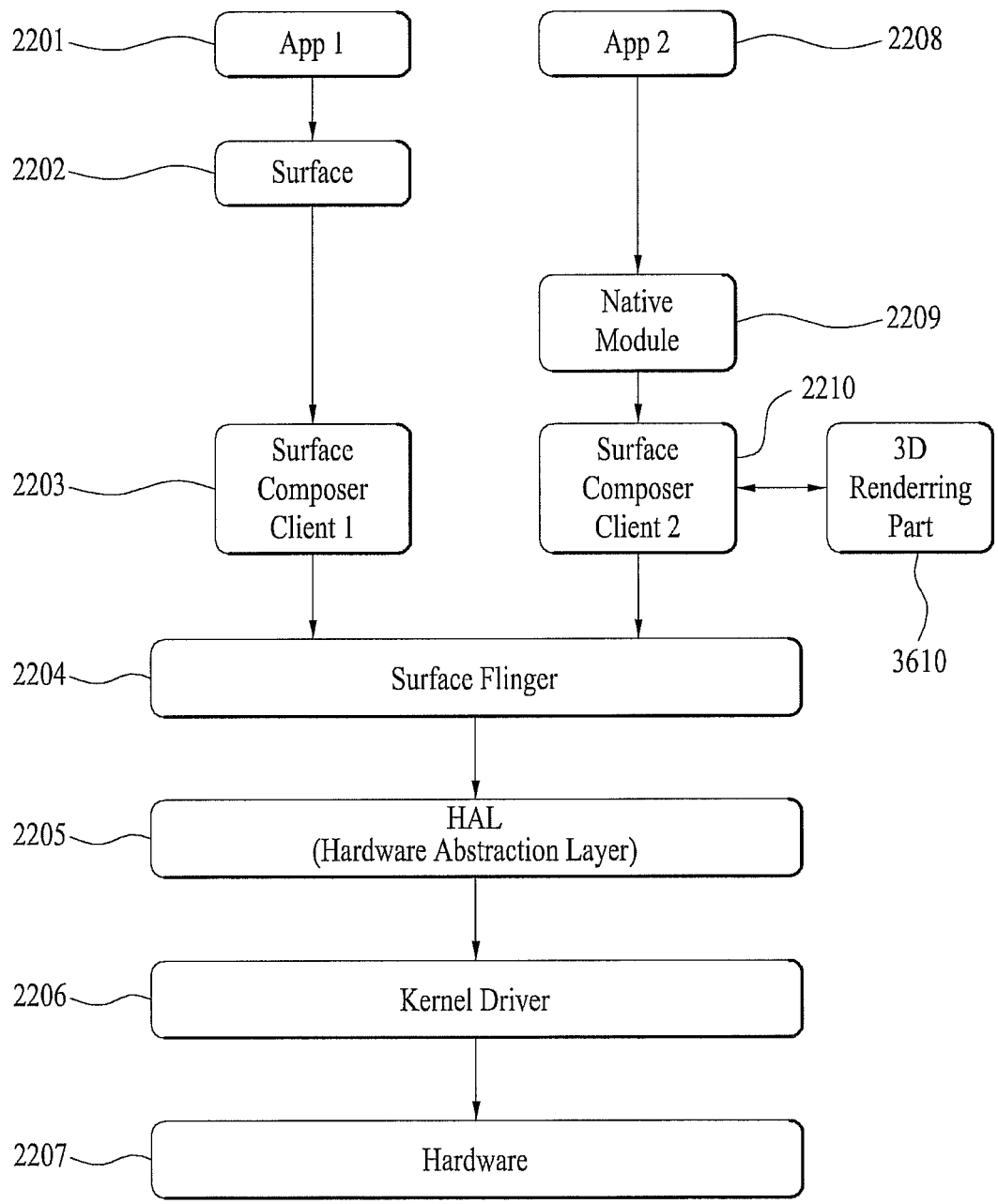
FIG. 36 is a diagram illustrating an example that a multimedia device illustrated in FIG. 22 is applied to a 3D TV.

FIG. 36 is a diagram illustrating an example that a multimedia device illustrated in FIG. 22 is applied to a 3D TV.

If one embodiment of the present disclosure is applied to a 3DTV, the OS of the multimedia device illustrated in FIG. 22 is designed as illustrated in FIG. 36. As compared with FIG. 22, a 3D rendering part 3610 is additionally provided in FIG. 36. Accordingly, the description of the other modules can be understood with reference to FIG. 22. However, a native module 2209 illustrated in FIG. 36 corresponds to that of FIG. 35.

Accordingly, the 3D rendering part 3610 illustrated in FIG. 36 is designed to render 2D graphic into 3D graphic based on the layer temporarily set by the 3D data processing part 3510 of the native module.

If the multimedia device is designed as illustrated in FIG. 35 and FIG. 36, it is advantageous in that the applications drafted in different codes can be displayed in their respective layer in a 3D type.

Moreover, although the drawings are illustrated respectively for convenience of description, the embodiments illustrated in the drawings may be incorporated to achieve a new embodiment. A recording medium that can be read from a computer having a program for implementing the aforementioned embodiments may be designed within the scope of the present disclosure.

The multimedia device and the operation method thereof according to the present disclosure may be configured by selective combination of all or some of the aforementioned embodiments without limited application of the embodiments, whereby various modifications can be made in the embodiments.

In the mean time, the operation method for the multimedia device according to the present disclosure can be implemented in a recording medium, which can be read by a processor provided in the multimedia device, as a code that can be read by the processor. The recording medium that can be read by the processor includes all kinds of recording media in which data that can be read by the processor are stored.

Examples of the recording medium include ROM, RAM, CD-ROM, magnetic tape, floppy disk, and optical data memory. Also, another example of the recording medium may be implemented in a type of carrier wave such as transmission through Internet. Also, the recording medium that can be read by the processor may be distributed in a computer system connected to a network, whereby codes that can be read by the processor can be stored and implemented in a distributive mode.

Accordingly, the present disclosure is directed to a multimedia device having an operating system capable of processing multiple graphic data and a method for controlling the same, which substantially obviate ones or more problems due to limitations and disadvantages of the related art.

An object of the present disclosure is to provide an operating system that can simultaneously process graphic data of a managed application and graphic data of an application drafted in a native code.

Another object of the present disclosure is to provide a solution for more exactly and quickly processing graphic data of an application (for example, subtitle, teletext, caption, etc.) that requires time critical, maximum performance, etc.

Other object of the present disclosure is to provide an operating system that can reuse an application drafted in a native code without changing it in a specific computing language.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a multimedia device provided with an operating system (OS) capable of processing a plurality of graphic data comprises a first client receiving first graphic data of a managed application; a native module pre-processing an application drafted in a native code; a second client receiving second graphic data of the application pre-processed by the native module; a composite module compositing the first graphic data output from the first client and the second graphic data output from the second client; and a display module outputting the composited first and second graphic data, wherein the composite module is accessed to the first client and the second client.

In another aspect of the present disclosure, a method for controlling a multimedia device provided with an operating system (OS) capable of processing a plurality of graphic data comprises the steps of receiving first graphic data of a managed application from a first client; pre-processing an application drafted in a native code; receiving second graphic data of the application pre-processed by the native module from a second client; compositing the first graphic data output from the first client and the second graphic data output from the second client; displaying the first graphic data of the composited data in a first region inside a screen of the multimedia device; and displaying the second graphic data of the composited data in a second region inside the screen of the multimedia device.

According to one embodiment of the present disclosure, there is provided an operating system that can simultaneously process graphic data of a managed application and graphic data of an application drafted in a native code.

Also, according to another embodiment of the present disclosure, there is provided a solution for more exactly and quickly processing graphic data of an application (for example, subtitle, teletext, caption, etc.) that requires time critical, maximum performance, etc.

Moreover, according to other embodiment of the present disclosure, there is provided an operating system that can reuse an application drafted in a native code without changing it in a specific computing language.

It is to be understood that both the foregoing general description and the following detailed description of the present disclosure are exemplary and explanatory and are intended to provide further explanation of the disclosure as claimed.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A multimedia device provided with an operating system (OS) capable of processing a plurality of graphic data, the multimedia device comprising:

a native module pre-processing an application drafted in a native code;

a first client receiving first graphic data of a managed application;

a second client receiving second graphic data of the application pre-processed by the native module;

a composite module compositing the first graphic data output from the first client and the second graphic data output from the second client; and a display module outputting the composited first and second graphic data, wherein the first graphic data bypasses native module, further the native module further comprising, an application interface controlled by the managed application, and controlling start and end of the native module;

a data interface receiving the application drafted in a native code through broadcast or network;

a graphic module processing the graphic data of the application received from the data interface into second graphic data that can be output; and a client interface forwarding the processed second graphic data to the second client.

2. The multimedia device as claimed in claim 1, wherein a hardware abstraction layer (HAL) and a kernel driver are sequentially located between the composite module and the display module.

3. The multimedia device as claimed in claim 1, wherein the display module displays the first graphic data in a first region inside a screen of the multimedia device, and displays the second graphic data in a second region inside the screen of the multimedia device.

4. The multimedia device as claimed in claim 1, wherein the application drafted in a native code corresponds to an application related to at least one or more of teletext, subtitle and caption.

5. The multimedia device as claimed in claim 1, wherein the OS corresponds to Android OS.

6. A method for controlling a multimedia device provided with an operating system (OS) capable of processing a plurality of graphic data, the method comprising:

receiving first graphic data of a managed application from a first client; wherein the managed application corresponds to an application drafted in Java language;

pre-processing an application drafted in a native code, wherein the application drafted in a native code corresponds to an application drafted in non-Java language;

receiving second graphic data of the application pre-processed by the native module from a second client;

compositing the first graphic data output from the first client and the second graphic data output from the second client;

displaying the first graphic data of the composited data in a first region inside a screen of the multimedia device; and displaying the second graphic data of the composited data in a second region inside the screen of the multimedia device.

7. The method as claimed in claim 6, wherein the pre-processing step includes:

receiving the application drafted in a native code through the broadcast or network;

processing the graphic data of the received application into second graphic data that can be output; and forwarding the processed second graphic data to the second client.

8. The method as claimed in claim 6, wherein the application drafted in a native code corresponds to an application related to at least one or more of teletext, subtitle and caption.

9. The method as claimed in claim 6, wherein the OS corresponds to Android OS.

10. A multimedia device provided with an operating system (OS) capable of processing a plurality of graphic data, the multimedia device comprising:

a native module pre-processing an application drafted in a native code, wherein the application drafted in a native code corresponds to an application drafted in non-Java language;

a first client receiving first graphic data of a managed application, wherein the managed application corresponds to an application drafted in Java language;

a second client receiving second graphic data of the application pre-processed by the native module;

a composite module compositing the first graphic data output from the first client and the second graphic data output from the second client; and a display module outputting the composited first and second graphic data, wherein the first graphic data bypasses native module.

* * * * *